United States Patent
Barsoum et al.

(10) Patent No.: US 11,691,878 B2
(45) Date of Patent: Jul. 4, 2023

(54) EDGE CAPPING OF 2D-MXENE SHEETS WITH POLYANIONIC SALTS TO MIGITATE OXIDATION IN AQUEOUS COLLOIDAL SUSPENSIONS

(71) Applicant: Drexel University, Philadelphia, PA (US)

(72) Inventors: Michel Barsoum, Moorestown, NJ (US); Varun Natu, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 0 days.

(21) Appl. No.: 17/617,082

(22) PCT Filed: Jun. 12, 2020

(86) PCT No.: PCT/US2020/037487
§ 371 (c)(1),
(2) Date: Dec. 7, 2021

(87) PCT Pub. No.: WO2020/252304
PCT Pub. Date: Dec. 17, 2020

(65) Prior Publication Data
US 2022/0227626 A1 Jul. 21, 2022

Related U.S. Application Data

(60) Provisional application No. 62/860,970, filed on Jun. 13, 2019.

(51) Int. Cl.
*C01B 21/076* (2006.01)
*C01B 32/90* (2017.01)
(Continued)

(52) U.S. Cl.
CPC .......... *C01B 21/076* (2013.01); *C01B 21/062* (2013.01); *C01B 21/0617* (2013.01); *C01B 21/0637* (2013.01); *C01B 32/90* (2017.08); *C09C 1/0006* (2013.01); *C01P 2002/20* (2013.01); *C01P 2004/84* (2013.01); *C01P 2006/40* (2013.01)

(58) Field of Classification Search
None
See application file for complete search history.

(56) References Cited

U.S. PATENT DOCUMENTS 9,193,595 B2 * 11/2015 Barsoum ............. H01M 10/052

FOREIGN PATENT DOCUMENTS

WO 2012/177712 A1 12/2012
WO 2014/088995 A1 6/2014
(Continued)

OTHER PUBLICATIONS

Bidwell J. I., et al., "The Interaction of Kaolinite with Polyphosphate and Polyacrylate in Aqueous Solutions—Some Preliminary Results," Clay Miner, vol. 8, 1970, pp. 445-459.
(Continued)

*Primary Examiner* — Daniel S Gatewood
(74) *Attorney, Agent, or Firm* — BakerHostetler

(57) ABSTRACT

Provided are methods of stabilizing MXene compositions using polyanionic salts so as to reduce the oxidation of the MXenes. Also provided are stabilized MXene compositions.

19 Claims, 10 Drawing Sheets

(51) Int. Cl.
C01B 21/06 (2006.01)
C09C 1/00 (2006.01)

(56) References Cited

FOREIGN PATENT DOCUMENTS

| WO | 2016/049109 A2 | 3/2016 |
|---|---|---|
| WO | 2016/140948 A1 | 9/2016 |
| WO | 2017/011044 A2 | 1/2017 |
| WO | 2018/140145 A1 | 8/2018 |

OTHER PUBLICATIONS

Biesinger M C., et al., "Resolving surface chemical states in XPS analysis of first row transition metals, oxides and hydroxides: Cr, Mn, Fe, Co and Ni," Smart, Appl. Surf. Sci, vol. 257, Issue 7, 2011, pp. 2717-2730.
Chae Y., et al., "An investigation into the factors governing the oxidation of two-dimensional Ti3C2 MXene†," Nanoscale, vol. 11, 2019, pp. 8387-8393.
Collini P., et al., "Electrophoretic Deposition of Two-Dimensional Titanium Carbide (MXene) Thick Films," J.Electrochem. Soc, vol. 164, 2017, pp. D573-D580.
Ding L., et al., "MXene molecular sieving membranes for highly efficient gas separation," Nat. Common, vol. 9, 2018, 155. pp. 1-7.
Edzwald J. K., et al., "Phosphate adsorption reactions with clay minerals," Environ. Sci. Technol, vol. 10, 1976, pp. 485-490.
Evans J. A., et al., "Specific energy consumption values for various refrigerated food cold stores," Energy Build, vol. 74, 2014, pp. 141-151.
Ghidiu M., et al., Ion-Exchange and Cation Solvation Reactions in Ti3C2 MXene, Chem. Mater, vol. 28, 2016, pp. 3507-3514.
Ghidiu M., et al.,"Alkylammonium Cation Intercalation into Ti3C2 (MXene): Effects on Properties and Ion-Exchange Capacity Estimation," J. Am. Ceram. Soc, vol. 29, Issue 3, 2017, pp. 1099-1106.
Greczynski G., et al., "C?1s Peak of Adventitious Carbon Aligns to the Vacuum Level: Dire Consequences for Material's Bonding Assignment by Photoelectron Spectroscopy," Chem Phys Chem, vol. 18, Issue 12, 2017, pp. 1507-1512.
Halim J., et al., "X-ray photoelectron spectroscopy of select multi-layered transition metal carbides (MXenes)," Appl. Surf. Sci, vol. 362, 2016, pp. 406-417.
Han M., et al., "Ti3C2 MXenes with Modified Surface for High-Performance Electromagnetic Absorption and Shielding in the X-Band," ACS Appl. Mater. Interfaces, vol. 8, Issue 32, 2016, pp. 21011-21019.
Huang S., et al., "Hydrolysis of 2D Transition-Metal Carbides (MXenes) in Colloidal Solutions," Inorg. Chem, vol. 58, 2019, pp. 1958-1966.
Intikhab S., et al., "Stoichiometry and surface structure dependence of hydrogen evolution reaction activity and stability of MoxC MXenes," J. Catal, vol. 371, 2019, pp. 325-332.
Jiang et al., 'Ultrathin Ti3C2Tx (MXene) Nanosheet-Wrapped NiSe2 Octahedral Crystal for Enhanced Supercapacitor Performance and Synergetic Electrocatalytic Water Splitting, Nano-Micro Letters, Apr. 4, 2019, 14 pages.
Kulakovskaya T. V., et al., "Inorganic polyphosphate in industry, agriculture and medicine: Modern state and outlook," Process Biochem, vol. 47, 2012, pp. 1-10.
Li Q., et al., "Recent advances in oxidation and degradation mechanisms of ultrathin 2D materials under ambient conditions and their passivation strategies," J. Mater. Chem. A, vol. 7, 2019, pp. 4291-4312.

M. Ghidiu, et al., "Conductive two-dimensional titanium carbide 'clay' with high volumetric capacitance," Nature, vol. 516, 2014. pp. 78-81.
Maleski K., et al., "Dispersions of Two-Dimensional Titanium Carbide MXene in Organic Solvents," Chem. Mater, vol. 29, Issue 4, 2017, pp. 1632-1640.
Mashtalir O., et al., "Dye adsorption and decomposition on two-dimensional titanium carbide in aqueous media," J. Mater Chem. A, vol. 2, 2014, pp. 14334-14338.
Naguib et al, "Two-Dimensional Nanocrystals Produced by Exfoliation of Ti.sub.3AlC.sub.2", Advanced Materials, vol. 23, 2011, pp. 4248-4253.
Naguib et al, "Two-Dimensional Transition Metal Carbides", American Chemical Society, vol. 6, Issue 2, Feb. 2012, 1322-1331.
Naguib M., et al., "Large-scale delamination of multi-layers transition metal carbides and carbonitrides "MXenes"," Dalt. Trans, vol. 44, 2015, pp. 9353-9358.
Natu et al. "Edge Capping of 2D-MXene Sheets with Polyanionic Salts To Mitigate Oxidation in 1-22 Aqueous Colloidal Suspensions" Angewandte Chemie International Edition, Jul. 10, 2019, pp. 12655-12660.
Natu V., et al., "Effect of Edge Charges on Stability and Aggregation of Ti3C2Tz MXene Colloidal Suspensions," J. Phys. Chem. C, vol. 122, 2018, pp. 27745-27753.
Natu V., et al., "Mesoporous MXene powders synthesized by acid induced crumpling and their use as Na-ion battery anodes," Mater. Res. Lett, vol. 6, Issue 4, 2018, pp. 230-235.
Novoselov K.S., et al., "Two-dimensional atomic crystals," Proc. Natl. Acad. Set, vol. 102, 2005, pp. 10451-10453.
Persson I., et al., "On the organization and thermal behavior of functional groups on Ti3C2 MXene surfaces in vacuum," 2D Mater, vol. 5, 2017, 015002. pp. 1-10.
Ren C. E., et al., "Voltage-Gated Ions Sieving through 2D MXene Ti3C2Tx Membranes," ACS Appl. Nano Mater, vol. 1, Issue 7, 2018, pp. 3644-3652.
Sokol M., et al., "On the Chemical Diversity of the MAX Phases," Trends Chem, vol. 1, Issue 2, 2019, pp. 210-233.
U.S. Appl. No. 14/094,966.
Verger L., et al., "Overview of the synthesis of MXenes and other ultrathin 2D transition metal carbides and nitrides," Curr. Opin. SolidState Mater. Sci, vol. 23, Issue 3, 2019, pp. 149-163.
Wang et al. "Effective Removal of Anionic Re(VII) by Surface-Modified Ti2CTx MXene 1-22 NanocompositesL Implications for Tc(VII) Sequestration", Environmental Science & Technology, Mar. 7, 2019, 35 pages.
Wang G., et al., "Physics and chemistry of oxidation of two-dimensional nanomaterials by molecular oxygen," Wiley Interdiscip. Rev. Comput. Mol. Sci, vol. 7, Issue 1, 2017, e1280. pp. 1-16.
Wu et al., "Stabilizing the MXenes by Carbon Nanoplating for Developing Hierarchical Nanohybrids with Efficient Lithium Storage and Hydrogen Evolution Capability", Advanced Materials, Apr. 24, 2017, 1607017, pp. 1-8.
Xia et al., "Rediscovering black phosphorus as an anisotropic layered material for optoelectronics and electronics," Nat. Commun, vol. 5, 2014, 4458. pp. 1-6.
Yoon Y., et al., "Low temperature solution synthesis of reduced two dimensional Ti3C2 MXenes with paramagnetic behaviour," Nanoscale, vol. 10, 2018, pp. 22429-22438.
Zhang C. J., et al., "Oxidation Stability of Colloidal Two-Dimensional Titanium Carbides (MXenes)," Chem. Mater, vol. 29, Issue 11, 2017, pp. 4848-4856.

* cited by examiner

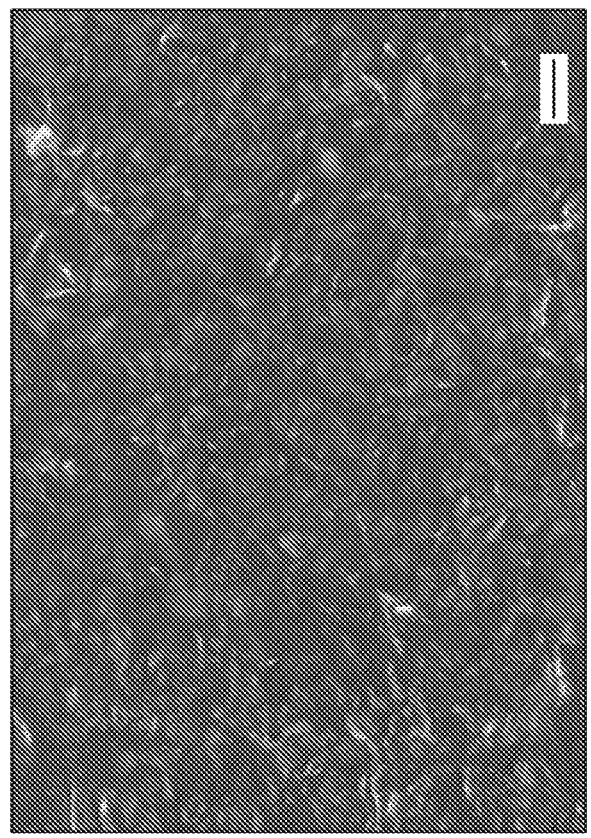
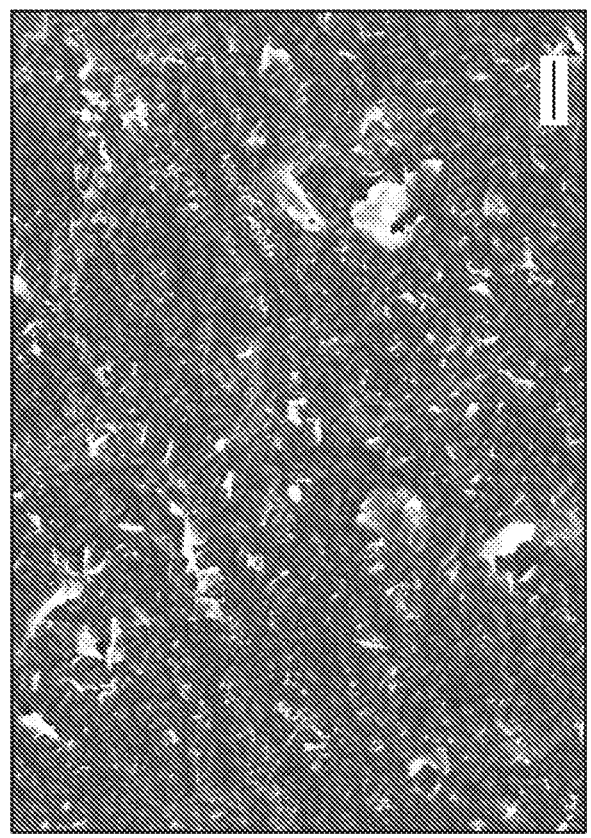
FIG. 3A
FIG. 3B

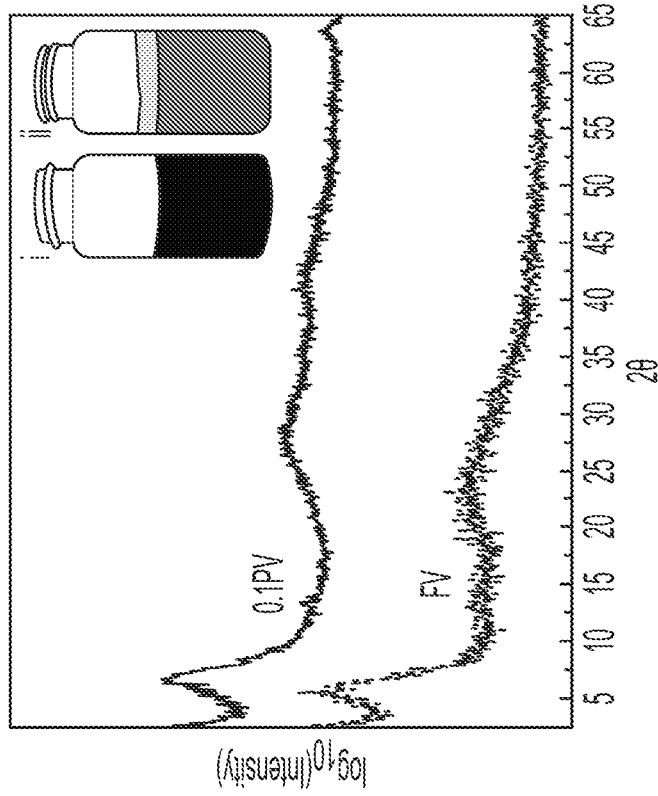
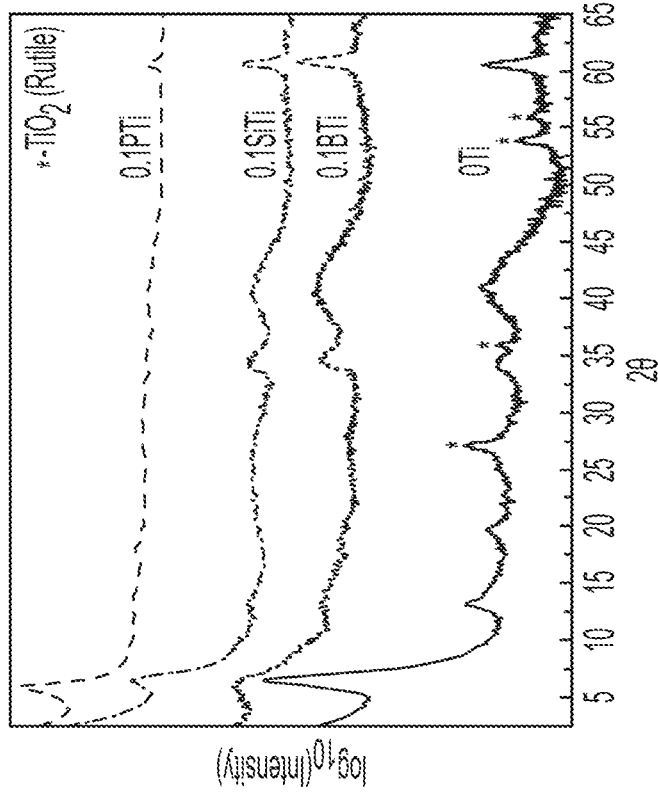
FIG. 6A
FIG. 6B

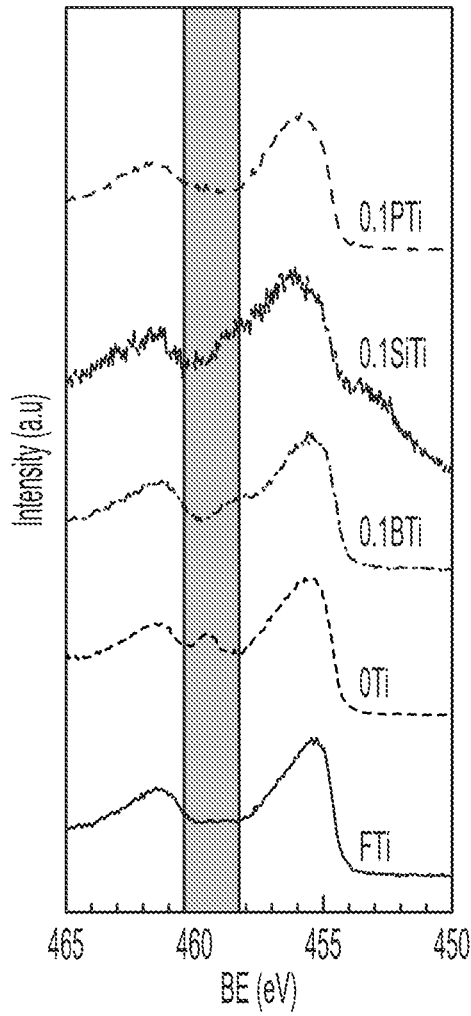
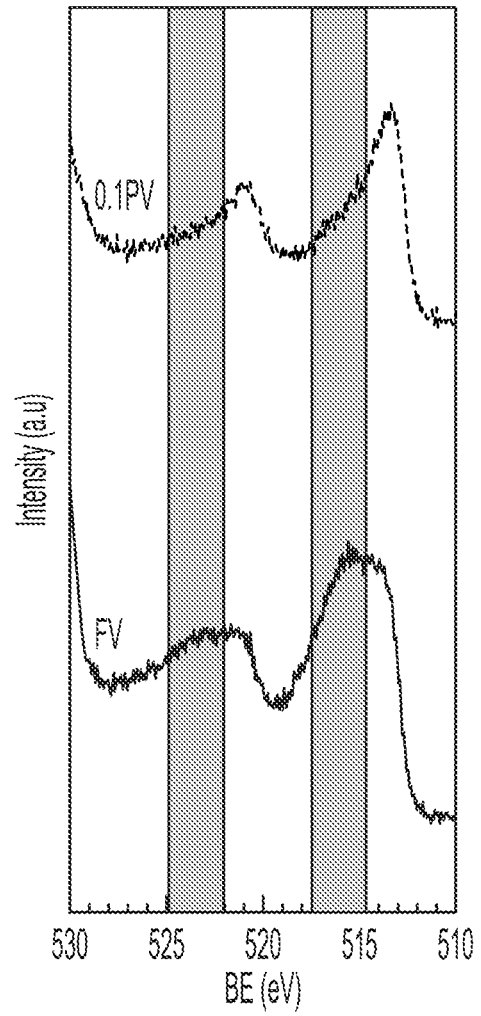
FIG. 9A
FIG. 9B

EDGE CAPPING OF 2D-MXENE SHEETS WITH POLYANIONIC SALTS TO MIGITATE OXIDATION IN AQUEOUS COLLOIDAL SUSPENSIONS

CROSS-REFERENCE TO RELATED APPLICATIONS

The present application is the National Stage Application of International Patent Application No. PCT/US2020/037487 (filed Jun. 12, 2020), which claims priority to and the benefit of U.S. patent application Ser. No. 62/860,970, "Edge Capping Of 2D-Mxene Sheets With Polyanionic Salts To Mitigate Oxidation In Aqueous Colloidal Suspensions" (filed Jun. 13, 2019), the entireties of which applications are incorporated herein by reference for any and all purposes.

GOVERNMENT RIGHTS

This invention was made with government support under Grant No. DMR-1740795 awarded by the National Science Foundation. The government has certain rights in the invention.

TECHNICAL FIELD

This disclosure is directed to methods of stabilizing MXene compositions and the resulting stabilized MXene compositions.

BACKGROUND

Since the discovery of graphene, several new 2D materials like phosphorene, transition metal dichalcogenides (TMDs), layered transition metal carbides/nitrides (MXenes), and the like have been extensively studied for their interesting electronic and optical properties. But unlike graphene, most of these 2D materials are unstable under ambient conditions and degrade over time due to oxidation. This severely hampers their potential to be used in practical devices and several strategies like their encapsulation by deposition of air stable oxides, polymer coatings, covalent functionalization, heteroatom atom doping, etc., have been shown to reduce or completely stop the oxidation process.

The MAX phases are a large family of machinable, atomically layered ternary carbides, nitrides or carbonitrides. They are defined by a general chemical formula $M_{n+1}AX_n$ ($1 \leq n \leq 3$), where M stands for early transition metal, A for group 13 or 14 elements and X represents C and/or N. MXenes, first discovered in 2011, are obtained by etching out the A layer from MAX phases most commonly by using and fluoride ion containing acid.

MXenes have a 2D morphology, with a general chemical formula of ($1 \leq n \leq 3$), or $M_{1.33}CT_z$, where T stands for various surface terminations like —F, —OH and/or —O. Since the initial discovery of $Ti_3C_2T_z$, which is the by far the most studied MXene, more than 30 new ones have been discovered. MXenes have shown applicability in numerous applications, including (without limitation) EMI shielding, energy storage, gas sensing, water purification, catalyst for hydrogen evolution reaction, and others.

Early reports on $Ti_3C_2T_z$ aqueous colloidal suspensions, demonstrated that oxidation occurred faster in aerated water than non-aerated water. This was taken to imply that dissolved oxygen in water was responsible for the oxidation. Zhang et al. were the first to systematically study the oxidation of $Ti_3C_2T_z$ colloids and showed that the suspensions were more stable under argon (Ar). They also showed that flakes with smaller lateral dimensions oxidized faster. Another important conclusion from their work was that $Ti_3C_2T_z$ oxidation starts at the flakes' edges and proceeded inwards. Huang and Mochalin showed that $Ti_3C_2T_z$ suspensions are more resistant to oxidation in isopropanol (IPA) than in water which, in turn, implies that it is not just dissolved oxygen that causes oxidation but also the water molecules themselves.

One way to prevent oxidation is to store MXenes in organic solvents. But the fact that MXenes form less stable suspensions in organic solvents compared to water presents a challenge to this approach. Another issue is the relatively lower MXene concentration colloids present in IPA as compared to water. Chae et al. found that storing MXene colloids at sub-zero temperatures (−18° C. and −80° C.) significantly increases their shelf life due to slowed oxidation kinetics, but oxidation was found to at even 5° C., thus making this approach relatively energy intensive. Accordingly, there is a need in the art for methods of mitigating oxidation in MXenes, as well as a need for MXene compositions that exhibit reduced oxidation.

SUMMARY

In meeting the described needs, the present disclosure is directed to stabilizing MXene compositions. Herein is disclosed the finding that addition of inorganic sodium salts of polyphosphates, polyborates, and polysilicates to MXene colloid can slow the oxidation process. These polyphosphates salts were chosen because they have been shown to adsorb at edges of clay sheets.

In one aspect, the present disclosure provides methods of stabilizing MXene compositions against oxidation, comprising: contacting a MXene composition with a polyanionic salt, the contacting being performed so as to give rise to a corresponding polyanionic salt-stabilized MXene composition.

Also provided are polyanionic salt-stabilized MXene compositions derived or derivable from a method of the present disclosure.

Further provided are compositions, comprising: a MXene composition having at least one layer having first and second surfaces and an edge; and at least one polyanion associated with the edge.

Additionally provided are electronic devices, comprising a composition according to the present disclosure.

BRIEF DESCRIPTION OF THE DRAWINGS

The present application is further understood when read in conjunction with the included drawings. For the purpose of illustrating the subject matter, there are shown in the drawings exemplary embodiments of the subject matter; however, the presently disclosed subject matter is not limited to the specific methods, devices, and systems disclosed. In addition, the drawings are not necessarily drawn to scale.

FIGS. 3A-3B provide SEM micrographs of FIG. 3A) FV, FIG. 3B) 0.1PV samples. Scale bar=1 μm.

FIG. 4C) 0.3SiTi (black), 0.5SiTi (red). The 0Ti (green) and FT (blue) spectra are added to each graph as reference.

FIGS. 6A-6B provide XRD patterns of, FIG. 6A) 0.1PTi (blue), 0.1SiTi (green), 0.1BTi (red) and 0PTi (black). FIG. 6B) 0.1PV (black), FV (red) samples. The patterns are shifted vertically for clarity. Inset shows digital photographs of i) 0.1PV (left) sample, and ii) 0V sample (right) after 3 weeks.

FIGS. 9A-9B provide XPS spectra of, from top to bottom, FIG. 9A) of 0.1PTi (blue), 0.1SiTi (green), 0.1BTi (red), 0Ti (black), FTi (black). Gray band at ≈460 eV represents the $Ti^{+4}$ oxidation state BE. FIG. 9B) 0.1PV (red, top) and FV (black, bottom) samples. Gray bands represent the $V^{+5}$ oxidation state BE.

FIG. 10A) Normalized intensities of P, Ti and C EELS signals in going from vacuum towards the edge of the MXene flake along LP1. The arrow gradients from blue to red, where blue color represents the area over vacuum and red the area over the MXene flake. The arrow marks correspond to the positions from where the signal was obtained. Similar arrows are marked on TEM image shown in b for easy comparison, FIG. 10B) TEM micrograph of flake used for EELS analysis. Scale bar=100 nm. FIG. 10C) Same as a, but along LP2.

DETAILED DESCRIPTION OF ILLUSTRATIVE EMBODIMENTS

Figure 1:
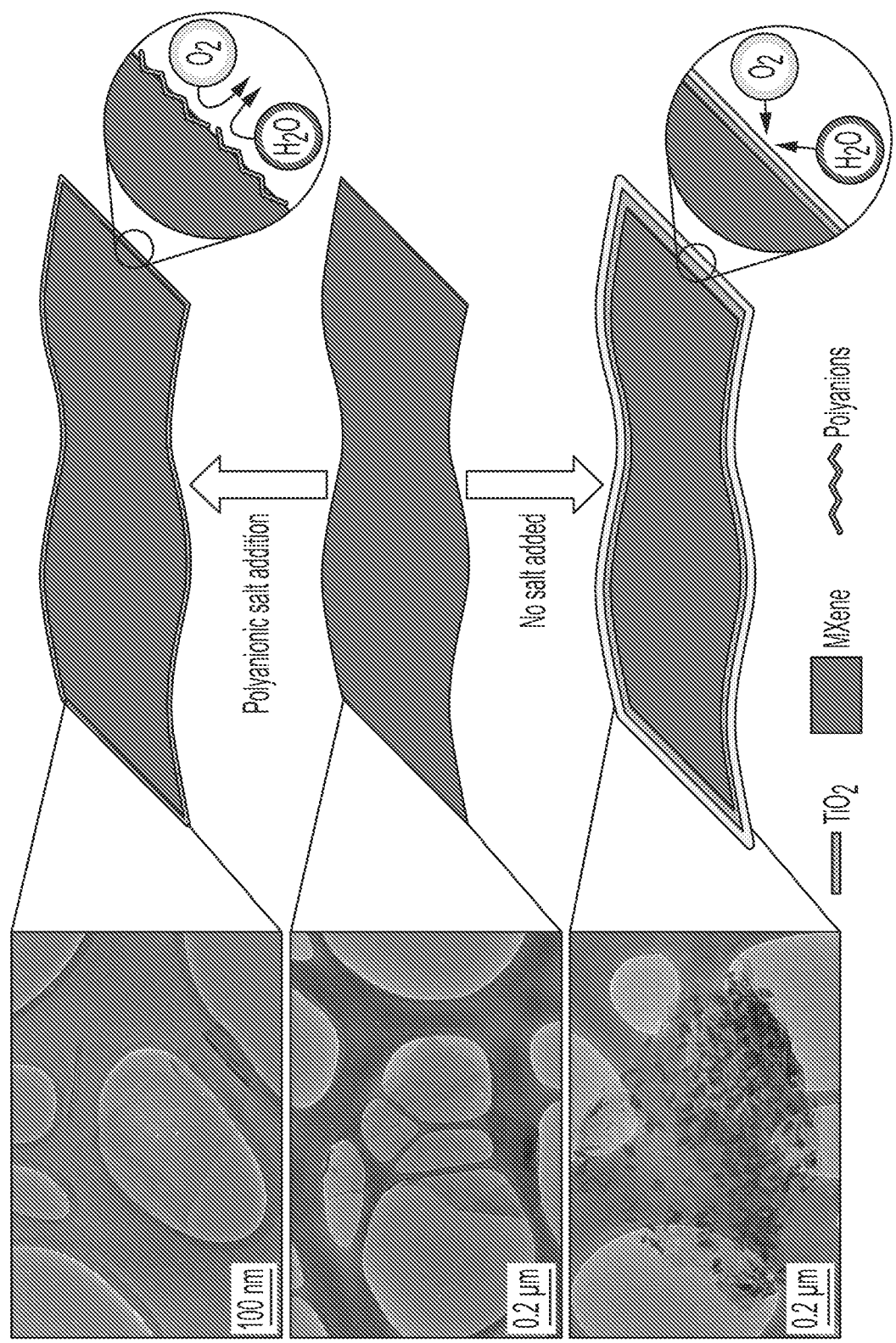
FIG. 1 provides a schematic of end-capping MXene materials.

MXenes have shown promise in many applications such as energy storage, catalysis, EMI shielding, among many others. However, MXene oxidation in aqueous colloidal suspensions when stored in water at ambient conditions remains a challenge. Herein we show that by simply capping the edges of individual MXene flakes—herein exemplified as $Ti_3C_2T_z$ and $V_2CT_z$—by polyanions such as polyphosphates, polysilicates and polyborates it is possible to quite significantly reduce their propensity for oxidation even in aerated water for weeks. This breakthrough is consistent with the realization that the edges of MXene sheets were positively charged. It is thus the first example of selectively functionalizing the edges differently from the MXene sheet surfaces.

While exemplified for these two MXene compositions, the methods employed here (and resulting compositions) are believed to extend to other MXene compositions. MXene compositions are also sometimes described in terms of the phrase "MX-enes" or "MX-ene compositions." MXenes may be described as two-dimensional transition metal carbides, nitrides, or carbonitrides comprising at least one layer having first and second surfaces, each layer described by a formula $M_{n+1}X_nT_x$ and comprising:

a substantially two-dimensional array of crystal cells, each crystal cell having an empirical formula of $M_{n+1}X_n$, such that each X is positioned within an octahedral array of M, wherein M is at least one Group IIIB, IVB, VB, or VIB metal, wherein each X is C, N, or a combination thereof;

n=1, 2, or 3; and wherein $T_x$ represents surface termination groups.

These so-called MXene compositions have been described in U.S. Pat. No. 9,193,595 and Application PCT/US2015/051588, filed Sep. 23, 2015, each of which is incorporated by reference herein in its entirety at least for its teaching of these compositions, their (electrical) properties, and their methods of making. That is, any such composition described in this Patent is considered as applicable for use in the present applications and methods and within the scope of the present invention. For the sake of completeness, M can be at least one of Sc, Y, Lu, Ti, Zr, Hf, V, Nb, Ta, Cr, Mo, or W. In certain embodiments in this class, M is at least one Group IVB, Group VB, or Group VIB metal, preferably Ti, Mo, Nb, V, or Ta. Certain of these compositions include those having one or more empirical formula wherein $M_{n+1}X_n$ comprises $Sc_2C$, $Ti_2C$, $V_2C$, $Cr_2C$, $Cr_2N$, $Zr_2C$, $Nb_2C$, $Hf_2C$, $Ti_3C_2$, $V_3C_2$, $Ta_3C_2$, $Ti_4C_3$, $V_4C_3$, $Ta_4C_3$, $Sc_2N$, $Ti_2N$, $V_2N$, $Cr_2N$, $Cr_2N$, $Zr_2N$, $Nb_2N$, $Hf_2C$, $Ti_3N_2$, $V_3C_2$, $Ta_3C_2$, $Ti_4N_3$, $V_4C_3$, $Ta_4N_3$ or a combination or mixture thereof. In particular embodiments, the $M_{n+1}X_n$ structure comprises $Ti_3C_2$, $Ti_2C$, $Ta_4C_3$ or $(V_{1/2}Cr_{1/2})_3C_3$. In some embodiments, M is Ti or Ta, and n is 1, 2, or 3, for example having an empirical formula $Ti_3C_2$ or $Ti_2C$. In some of these embodiments, at least one of said surfaces of each layer has surface terminations comprising hydroxide, oxide, sub-oxide, or a combination thereof. In certain preferred embodiments, the MXene composition is described by a formula $M_{n+1}X_nT_x$, where $M_{n+1}X_n$ are $Ti_2CT_x$, $Mo_2TiC_2T_x$, $Ti_3C_2T_x$, or a combination thereof, and $T_x$ is as described herein. Those embodiments wherein M is Ti, and n is 1 or 2, preferably 2, are especially preferred.

In other embodiments, the articles of manufacture and methods use compositions, wherein the two-dimensional transition metal carbide, nitrides, or carbonytride comprises a composition having at least one layer having first and second surfaces, each layer comprising:

a substantially two-dimensional array of crystal cells, each crystal cell having an empirical formula of $M'_2M''_nX_{n+1}$, such that each X is positioned within an octahedral array of M' and M'', and where $M''_n$ are present as individual two-dimensional array of atoms intercalated (sandwiched) between a pair of two-dimensional arrays of M' atoms, wherein M' and M'' are different Group IIIB, IVB, VB, or VIB metals (especially where M' and M'' are Ti, V, Nb, Ta, Cr, Mo, or a combination thereof), wherein each X is C, N, or a combination thereof, preferably C; and n=1 or 2.

These compositions are described in greater detail in Application PCT/US2016/028354, filed Apr. 20, 2016, which is incorporated by reference herein in its entirety at least for its teaching of these compositions and their methods of making. For the sake of completeness, in some embodiments, M' is Mo, and M'' is Nb, Ta, Ti, or V, or a combination thereof. In other embodiments, n is 2, M' is Mo, Ti, V, or a combination thereof, and M'' is Cr, Nb, Ta, Ti, or V, or a combination thereof. In still further embodiments, the empirical formula $M'_2M''_nX_{n+1}$ comprises $Mo_2TiC_2$, $Mo_2VC_2$, $Mo_2TaC_2$, $Mo_2NbC_2$, $Mo_2Ti_2C_3$, $Cr_2TiC_2$, $Cr_2VC_2$, $Cr_2TaC_2$, $Cr_2NbC_2$, $Ti_2NbC_2$, $Ti_2TaC_2$, $V_2TaC_2$, or $V_2TiC_2$, preferably $Mo_2TiC_2$, $Mo_2VC_2$, $Mo_2TaC_2$, or $Mo_2NbC_2$, or their nitride or carbonitride analogs. In still other embodiments, $M'_2M''_nX_{n+1}$ comprises $Mo_2Ti_2C_3$, $Mo_2V_2C_3$, $Mo_2Nb_2C_3$, $Mo_2Ta_2C_3$, $Cr_2Ti_2C_3$, $Cr_2V_2C_3$, $Cr_2Nb_2C_3$, $Cr_2Ta_2C_3$, $Nb_2Ta_2C_3$, $Ti_2Nb_2C_3$, $Ti_2Ta_2C_3$, $V_2Ta_2C_3$, $V_2Nb_2C_3$, or $V_2Ti_2C_3$, preferably $Mo_2Ti_2C_3$, $Mo_2V_2C_3$, $Mo_2Nb_2C_3$, $Mo_2Ta_2C_3$, $Ti_2Nb_2C_3$, $Ti_2Ta_2C_3$, or $V_2Ta_2C_3$, or their nitride or carbonitride analogs.

Each of these compositions having empirical crystalline formulae $M_{n+1}X_n$ or $M'_2M''_nX_{n+1}$ are described in terms of comprising at least one layer having first and second surfaces, each layer comprising a substantially two-dimensional array of crystal cells. In some embodiments, these compositions comprise layers of individual two-dimensional cells. In other embodiments, the compositions comprise a plurality of stacked layers. Additionally, in some embodiments, at least one of said surfaces of each layer has surface terminations (optionally designated "$T_s$," or "$T_x$") comprising alkoxide, carboxylate, halide, hydroxide, hydride, oxide, sub-oxide, nitride, sub-nitride, sulfide, thiol, or a combination thereof. In some embodiments, at least one of said surfaces of each layer has surface terminations comprising alkoxide, fluoride, hydroxide, oxide, sub-oxide, or a combination thereof. In still other embodiments, both surfaces of each layer have said surface terminations comprising alkoxide, fluoride, hydroxide, oxide, sub-oxide, or a combination thereof. As used herein the terms "sub-oxide," "sub-nitride," or "sub-sulfide" is intended to connote a composition containing an amount reflecting a sub-stoichiometric or a mixed oxidation state of the M metal at the surface of oxide, nitride, or sulfide, respectively. For example, various forms of titania are known to exist as $TiO_x$, where x can be less than 2. Accordingly, the surfaces of the present invention may also contain oxides, nitrides, or sulfides in similar sub-stoichiometric or mixed oxidation state amounts.

In the present disclosure, these MXenes may comprise simple individual layers, a plurality of stacked layers, or a combination thereof. Each layer may independently comprise surfaces functionalized by any of the surface coating features described herein (e.g., as in alkoxide, carboxylate, halide, hydroxide, hydride, oxide, sub-oxide, nitride, sub-nitride, sulfide, thiol, or a combination thereof) or may be also partially or completely functionalized by polymers, either on the surface of individual layers, for example, where the two-dimensional compositions are embedded within a polymer matrix, or the polymers may be intercalated between layers to form structural composites, or both.

General Terms

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

The transitional terms "comprising," "consisting essentially of," and "consisting" are intended to connote their generally in accepted meanings in the patent vernacular; that is, (i) "comprising," which is synonymous with "including," "containing," or "characterized by," is inclusive or open-ended and does not exclude additional, unrecited elements or method steps; (ii) "consisting of" excludes any element, step, or ingredient not specified in the claim; and (iii) "consisting essentially of" limits the scope of a claim to the specified materials or steps and those that do not materially affect the basic and novel characteristic(s) of the claimed invention. Embodiments described in terms of the phrase "comprising" (or its equivalents), also provide, as embodiments, those which are independently described in terms of "consisting of" and "consisting essentially of" For those composition embodiments provided in terms of "consisting essentially of," the basic and novel characteristic(s) is the ability to provide the described effect associated with the description as described herein or as explicitly specified.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C."

Throughout this specification, words are to be afforded their normal meaning, as would be understood by those skilled in the relevant art. However, so as to avoid misunderstanding, the meanings of certain terms will be specifically defined or clarified.

The terms "MXenes" or "two-dimensional (2D) crystalline transition metal carbides" or two-dimensional (2D) transition metal carbides" may be used interchangeably to refer collectively to compositions described herein as comprising substantially two-dimensional crystal lattices of the general formulae $M_{n+1}X_n(T_s)$, $M_2A_2X(T_s)$. and $M'_2M''_n X_{n+1}(T_s)$, where M, M', M", A, X, and $T_s$ are defined herein. Supplementing the descriptions herein, $M_{n+1}X_n(T_s)$ (including $M'_2M''_mX_{m+1}(T_s)$ compositions) may be viewed as comprising free standing and stacked assemblies of two dimensional crystalline solids. Collectively, such compositions are referred to herein as "$M_{n+1}X_n(T_s)$," "MXene," "MXene compositions," or "MXene materials." Additionally, these terms "$M_{n+1}X_n(T_s)$," "MXene," "MXene compositions," or "MXene materials" can also independently refer to those compositions derived by the chemical exfoliation of MAX phase materials, whether these compositions are present as free-standing 2-dimensional or stacked assemblies (as described further below). These compositions may be comprised of individual or a plurality of such layers. In some embodiments, the MXenes comprising stacked assemblies may be capable of, or have atoms, ions, or molecules, that are intercalated between at least some of the layers. In other embodiments, these atoms or ions are lithium.

The term "crystalline compositions comprising at least one layer having first and second surfaces, each layer comprising a substantially two-dimensional array of crystal cells" refers to the unique character of these materials. For purposes of visualization, the two-dimensional array of crystal cells may be viewed as an array of cells extending in an x-y plane, with the z-axis defining the thickness of the composition, without any restrictions as to the absolute orientation of that plane or axes. It is preferred that the at least one layer having first and second surfaces contain but a single two-dimensional array of crystal cells (that is, the z-dimension is defined by the dimension of approximately one crystal cell), such that the planar surfaces of said cell array defines the surface of the layer; it should be appreciated that real compositions may contain portions having more than single crystal cell thicknesses.

That is, as used herein, "a substantially two-dimensional array of crystal cells" refers to an array which preferably includes a lateral (in x-y dimension) array of crystals having a thickness of a single unit cell, such that the top and bottom surfaces of the array are available for chemical modification.

The MXene component of these compositions can be any of the compositions described in any one of U.S. patent application Ser. No. 14/094,966, International Applications PCT/US2012/043273, PCT/US2013/072733, PCT/US2015/051588, PCT/US2016/020216, or PCT/US2016/028,354. Specific such compositions are described elsewhere herein. In certain preferred embodiments, the MXenes comprise substantially two-dimensional array of crystal cells, each crystal cell having an empirical formula of $M_{n+1}X_n$, or $M'_2M''_nX_{n+1}$, where M, M', M", and X are defined elsewhere herein. Those descriptions are incorporated here. In some independent embodiments, M is Ti or Ta.

MXenes are known in the art to include nanosheet compositions comprising substantially two-dimensional array of crystal cells having the general formulae $M_2X$, $M_3X_2$ and $M_4X_3$. The MXene compositions described herein are also sometimes described in terms of the phrase "MX-enes" or "MX-ene compositions." MXenes have shown great promise for a variety of applications including energy storage, electromagnetic interference shielding, sensors, water purifications, and medicine.

In some embodiments, MXenes are described as two-dimensional transition metal carbides, nitrides, or carbonitrides comprising at least one layer having first and second surfaces, each layer described by a formula $M_{n+1}X_nT_x$ and comprising:

a substantially two-dimensional array of crystal cells, each crystal cell having an empirical formula of $M_{n+1}X_n$, such that each X is positioned within an octahedral array of M, wherein M is at least one Group IIIB, IVB, VB, or VIB metal, wherein each X is C, N, or a combination thereof;

n=1, 2, or 3; and wherein $T_x$ represents surface termination groups.

These so-called MXene compositions have been described in U.S. Pat. No. 9,193,595 and Application PCT/US2015/051588, filed Sep. 23, 2015, each of which is incorporated by reference herein in its entirety at least for its teaching of these compositions, their (electrical) properties, and their methods of making. That is, any such composition described in this Patent is considered as applicable for use in the present applications and methods and within the scope of the present invention. For the sake of completeness, M can be at least one of Sc, Y, Lu, Ti, Zr, Hf, V, Nb, Ta, Cr, Mo, or W. In certain embodiments in this class, M is at least one Group IVB, Group VB, or Group VIB metal, preferably Ti, Mo, Nb, V, or Ta. Certain of these compositions include those having one or more empirical formula wherein $M_{n+1}X_n$ comprises $Sc_2C$, $Ti_2C$, $V_2C$, $Cr_2C$, $Cr_2N$, $Zr_2C$, $Nb_2C$, $Hf_2C$, $Ti_3C_2$, $V_3C_2$, $Ta_3C_2$, $Ti_4C_3$, $V_4C_3$, $Ta_4C_3$, $Sc_2N$, $Ti_2N$, $V_2N$, $Cr_2N$, $Cr_2N$, $Zr_2N$, $Nb_2N$, $Hf_2C$, $Ti_3N_2$, $V_3C_2$, $Ta_3C_2$, $Ti_4N_3$, $V_4C_3$, $Ta_4N_3$ or a combination or mixture thereof. In particular embodiments, the $M_{n+1}X_n$ structure comprises $Ti_3C_2$, $Ti_2C$, $Ta_4C_3$ or $(V_{1/2}Cr_{1/2})_3C_3$. In some embodiments, M is Ti or Ta, and n is 1, 2, or 3, for example having an empirical formula $Ti_3C_2$ or $Ti_2C$. In some of these embodiments, at least one of said surfaces of each layer has surface terminations comprising hydroxide, oxide, sub-oxide, or a combination thereof. In certain preferred embodiments, the MXene composition is described by a formula $M_{n+1}X_nT_x$, where $M_{n+1}X_n$ are $Ti_2CT_x$, $Mo_2TiC_2T_x$, $Ti_3C_2T_x$, or a combination thereof, and $T_x$ is as described herein. Those embodiments wherein M is Ti, and n is 1 or 2, preferably 2, are especially preferred.

Additionally, or alternatively, the articles of manufacture and methods use compositions, wherein the two-dimensional transition metal carbide, nitrides, or carbonnitride comprises a composition having at least one layer having first and second surfaces, each layer comprising:

a substantially two-dimensional array of crystal cells, each crystal cell having an empirical formula of $M'_2M''_nX_{n+1}$, such that each X is positioned within an octahedral array of M' and M", and where $M''_n$ are present as individual two-dimensional array of atoms intercalated (sandwiched) between a pair of two-dimensional arrays of M' atoms, wherein M' and M" are different Group IIIB, IVB, VB, or VIB metals (especially where M' and M" are Ti, V, Nb, Ta, Cr, Mo, or a combination thereof), wherein each X is C, N, or a combination thereof, preferably C; and n=1 or 2.

These compositions are described in greater detail in Application PCT/US2016/028354, filed Apr. 20, 2016, which is incorporated by reference herein in its entirety at least for its teaching of these compositions and their methods of making. For the sake of completeness, in some embodiments, M' is Mo, and M" is Nb, Ta, Ti, or V, or a combination thereof. In other embodiments, n is 2, M' is Mo, Ti, V, or a combination thereof, and M" is Cr, Nb, Ta, Ti, or V, or a combination thereof. In still further embodiments, the empirical formula $M'_2M''_nX_{n+1}$ comprises $Mo_2TiC_2$, $Mo_2VC_2$, $Mo_2TaC_2$, $Mo_2NbC_2$, $Mo_2Ti_2C_3$, $Cr_2TiC_2$, $Cr_2VC_2$, $Cr_2TaC_2$, $Cr_2NbC_2$, $Ti_2NbC_2$, $Ti_2TaC_2$, $V_2TaC_2$, or $V_2TiC_2$, preferably $Mo_2TiC_2$, $Mo_2VC_2$, $Mo_2TaC_2$, or $Mo_2NbC_2$, or their nitride or carbonitride analogs. In still other embodiments, $M'_2M''_nX_{n+1}$ comprises $Mo_2Ti_2C_3$, $Mo_2V_2C_3$, $Mo_2Nb_2C_3$, $Mo_2Ta_2C_3$, $Cr_2Ti_2C_3$, $Cr_2V_2C_3$, $Cr_2Nb_2C_3$, $Cr_2Ta_2C_3$, $Nb_2Ta_2C_3$, $Ti_2Nb_2C_3$, $Ti_2Ta_2C_3$, $V_2Ta_2C_3$, $V_2Nb_2C_3$, or $V_2Ti_2C_3$, preferably $Mo_2Ti_2C_3$, $Mo_2V_2C_3$, $Mo_2Nb_2C_3$, $Mo_2Ta_2C_3$, $Ti_2Nb_2C_3$, $Ti_2Ta_2C_3$, or $V_2Ta_2C_3$, or their nitride or carbonitride analogs.

Each of these compositions having empirical crystalline formulae $M_{n+1}X_n$ or $M'_2M''_nX_{n+1}$ are described in terms of comprising at least one layer having first and second surfaces, each layer comprising a substantially two-dimensional array of crystal cells. In some embodiments, these compositions comprise layers of individual two-dimensional cells. In other embodiments, the compositions comprise a plurality of stacked layers. Additionally, in some embodiments, at least one of said surfaces of each layer has surface terminations (optionally designated "$T_s$," or "$T_x$," or "$T_z$") comprising alkoxide, carboxylate, halide, hydroxide, hydride, oxide, sub-oxide, nitride, sub-nitride, sulfide, thiol, or a combination thereof. In some embodiments, at least one of said surfaces of each layer has surface terminations comprising alkoxide, fluoride, hydroxide, oxide, sub-oxide, or a combination thereof. In still other embodiments, both surfaces of each layer have said surface terminations comprising alkoxide, fluoride, hydroxide, oxide, sub-oxide, or a combination thereof. As used herein the terms "sub-oxide," "sub-nitride," or "sub-sulfide" is intended to connote a composition containing an amount reflecting a sub-stoichiometric or a mixed oxidation state of the M metal at the surface of oxide, nitride, or sulfide, respectively. For example, various forms of titania are known to exist as $TiO_x$, where x can be less than 2. Accordingly, the surfaces of the present invention may also contain oxides, nitrides, or sulfides in similar sub-stoichiometric or mixed oxidation state amounts.

In the present disclosure, these MXenes may comprise simple individual layers, a plurality of stacked layers, or a combination thereof. Each layer may independently comprise surfaces functionalized by any of the surface coating features described herein (e.g., as in alkoxide, carboxylate, halide, hydroxide, hydride, oxide, sub-oxide, nitride, sub-nitride, sulfide, thiol, or a combination thereof) or may be also partially or completely functionalized by polymers, either on the surface of individual layers, for example, where the two-dimensional compositions are embedded within a polymer matrix, or the polymers may be intercalated between layers to form structural composites, or both.

In certain applications, the MXene surface coatings can be adjusted to range from hydrophobic to hydrophilic, depending on post-synthesis treatment regimes.

The terms "MXenes" or "two-dimensional (2D) crystalline transition metal carbides" or two-dimensional (2D) transition metal carbides" may be used interchangeably to refer collectively to compositions described herein as comprising substantially two-dimensional crystal lattices of the general formulae $M_{n+1}X_n(T_s)$, $M_2A_2X(T_s)$. and $M'_2M''_nX_{n+1}(T_s)$, where M, M', M", A, X, and $T_s$ are defined herein. Supplementing the descriptions herein, $M_{n+1}X_n(T_s)$ (including $M'_2M''_mX_{m+1}(T_s)$ compositions) may be viewed as comprising free standing and stacked assemblies of two dimensional crystalline solids. Collectively, such compositions are referred to herein as "$M_{n+1}X_n(T_s)$," "MXene," "MXene compositions," or "MXene materials." Additionally, these terms "$M_{n+1}X_n(T_s)$," "MXene," "MXene compositions," or "MXene materials" can also independently refer to those compositions derived by the chemical exfoliation of MAX phase materials, whether these compositions are present as free-standing 2-dimensional or stacked assemblies (as described further below). These compositions may be comprised of individual or a plurality of such layers. In some embodiments, the MXenes comprising stacked assemblies may be capable of, or have atoms, ions, or molecules, that are intercalated between at least some of the layers. In other embodiments, these atoms or ions are lithium.

The term "crystalline compositions comprising at least one layer having first and second surfaces, each layer comprising a substantially two-dimensional array of crystal cells" refers to the unique character of these materials. For purposes of visualization, the two-dimensional array of crystal cells may be viewed as an array of cells extending in an x-y plane, with the z-axis defining the thickness of the composition, without any restrictions as to the absolute orientation of that plane or axes. It is preferred that the at least one layer having first and second surfaces contain but a single two-dimensional array of crystal cells (that is, the z-dimension is defined by the dimension of approximately one crystal cell), such that the planar surfaces of said cell array defines the surface of the layer; it should be appreciated that real compositions may contain portions having more than single crystal cell thicknesses.

That is, as used herein, "a substantially two-dimensional array of crystal cells" refers to an array which preferably includes a lateral (in x-y dimension) array of crystals having a thickness of a single unit cell, such that the top and bottom surfaces of the array are available for chemical modification.

It was determined that similar to clays, MXene surfaces are negatively charged while their edges are positively charged. Thus, as shown in FIG. 1, a working hypothesis—confirmed herein—was that if the polyanions adsorb at the MXene edges they may reduce their propensity for oxidation. MXenes generally tend to oxidize when stored as colloid in water at ambient conditions. But by capping the edges of individual MXene flakes by polyanions significantly reduces the rate of oxidation and makes long term storage of MXene as possible. This is important because helps to make solution processing of MXene scalable and facile.

Embodiments

The following listing of Embodiments is illustrative only and does not serve to limit the scope of the present disclosure or the appended claims.

Embodiment 1. A method of stabilizing MXene compositions against oxidation, comprising: contacting a MXene composition with a polyanionic salt, the contacting being performed so as to give rise to a corresponding polyanionic salt-stabilized MXene composition.

The MXene composition can, when contacted with the polyanionic salt, be in water or other aqueous medium. The salt-stabilized MXene composition can be dispersed in water (or other aqueous medium). Alternatively, the salt-stabilized MXene composition can also be dry or be essentially free of water.

The MXene composition that is contacted with the polyanionic salt can be aqueous, e.g., present in water or other aqueous medium. The MXene composition can also be present as a colloid or as another suspended form, though this is not a requirement.

The polyanionic salt can be present at, e.g., from about 0.01 to about 10 M, from about 0.1 to about 8 M, from about 0.01 to about 5 M, from about 0.1 to about 3 M, or even from about 0.1 to about 1 M. As described elsewhere herein (but without being bound to any particular theory), the polyanion component of the polyanionic salt associates with the edge of a MXene sheet by way of interaction between the positive charge at the edge of the sheet and the negative charge of the polyanion.

Embodiment 2. The method of Embodiment 1, wherein the MXene composition comprises: (a) at least one layer having first and second surfaces and an edge, each layer comprising a substantially two-dimensional array of crystal cells, each crystal cell having an empirical formula of $M_{n+1}X_n$, such that each X is positioned within an octahedral array of M, wherein M is at least one Group IIIB, IVB, VB, or VIB metal, wherein each X is C, N, or a combination thereof; n=1, 2 or 3; and wherein at least one of said surfaces of each layer has surface terminations comprising alkoxide, carboxylate, halide, hydroxide, hydride, oxide, sub-oxide, nitride, sub-nitride, sulfide, thiol, or a combination thereof, or (b) at least one layer having first and second surfaces and an edge, each layer comprising: a substantially two-dimensional array of crystal cells, each crystal cell having an empirical formula of $M'_2M''_nX_{n+1}$, such that each X is positioned within an octahedral array of M' and M'', and where $M''_n$ are present as individual two-dimensional array of atoms intercalated (sandwiched) between a pair of two-dimensional arrays of M' atoms, wherein M' and M'' are different Group IIIB, IVB, VB, or VIB metals, wherein each X is C, N, or a combination thereof, preferably C; and n=1 or 2.

Embodiment 3. The method of Embodiment 1, wherein $M_{n+1}X_n$ comprises $Sc_2C$, $Sc_2N$, $Ti_2C$, $Ti_2N$, $V_2C$, $V_2N$, $Cr_2C$, $Cr_2N$, $Zr_2C$, $Zr_2N$, $Nb_2C$, $Nb_2N$, $Hf_2C$, $Hf_2N$, $Ti_3C_2$, $Ti_3N_2$, $V_3C_2$, $Ta_3C_2$, $Ta_3N_2$, $Ti_4C_3$, $Ti_4N_3$, $V_4C_3$, $V_4N_3$, $Ta_4C_3$, $Ta_4N_3$, or a combination thereof.

Embodiment 4. The method of Embodiment 1, wherein $M_{n+1}X_n$ comprises $Ti_3C_2$, $Ti_3CN$, $Ti_2C$, $Ta_4C_3$ or $(V_{1/2}Cr_{1/2})_3C_2$.

Embodiment 5. The method of Embodiment 1, wherein M is at least one Group IVB, Group VB, or Group VIB metal.

Embodiment 6 The method of Embodiment 1, wherein M is at least one of Sc, Y, Lu, Ti, Zr, Hf, V, Nb, Ta, Cr, Mo, or W.

Embodiment 7. The method of Embodiment 1, wherein $M'_2M''_nX_{n+1}$ comprises $Mo_2TiC_2$, $Mo_2VC_2$, $Mo_2TaC_2$, $Mo_2NbC_2$, $Mo_2Ti_2C_3$, $Cr_2TiC_2$, $Cr_2VC_2$, $Cr_2TaC_2$, $Cr_2NbC_2$, $Ti_2NbC_2$, $Ti_2TaC_2$, $V_2TaC_2$, or $V_2TiC_2$, preferably $Mo_2TiC_2$, $Mo_2VC_2$, $Mo_2TaC_2$, $Mo_2NbC_2$, $Mo_2Ti_2C_3$, $Mo2V_2C_3$, $Mo_2Nb_2C_3$, $Mo_2Ta_2C_3$, $Cr_2Ti_2C_3$, $Cr_2V_2C_3$, $Cr_2Nb_2C_3$, $Cr_2Ta_2C_3$, $Nb_2Ta_2C_3$, $Ti_2Nb_2C_3$, $Ti_2Ta_2C_3$, $V_2Ta_2C_3$, $V_2Nb_2C_3$, or $V_2Ti_2C_3$, preferably $Mo_2Ti_2C_3$, $Mo_2V_2C_3$, $Mo_2Nb_2C_3$, $Mo_2Ta_2C_3$, $Ti_2Nb_2C_3$, $Ti_2Ta_2C_3$, or $V_2Ta_2C_3$, or their nitride or carbonitride analogs.

Embodiment 8. The method of any one of Embodiments 1-7, wherein the polyanionic salt comprises at least one of a polyphosphate, a polyborate, and a polysilicate.

Embodiment 9. The method of Embodiment 8, wherein the polyphosphate comprises diphosphate, triphosphate, tetraphosphate, or any combination thereof.

Embodiment 10. The method of Embodiment 8, wherein the polyborate comprises diborate, triborate, tetraborate, pentaborate, or any combination thereof.

Embodiment 11. The method of Embodiment 8, wherein the polysilicate comprises orthosilicate, disilicate, metasilicate, or pyrosilicate.

Embodiment 12. The method of Embodiment 8, wherein the polysilicate comprises a sorosilicate, a cyclosilicate, a single-chain inosilicate, a double-chain inosilicate, a phyllosilicate, or a tectosilicate.

Embodiment 13. The method of any one of Embodiments 1-12, wherein the polyanionic salt comprises an alkali metal or an alkaline earth metal.

Embodiment 14. The method of Embodiment 13, wherein the polyanionic salt comprises an alkali metal.

Embodiment 15. The method of any one of Embodiments 1-14, wherein polyanions of the polyanionic salt are associated with the edge of the MXene composition.

Embodiment 16. The method of any one of Embodiments 1-15, wherein the MXene composition is in colloid form. The salt-stabilize MXene composition can also be in colloid form.

Embodiment 17. A polyanionic salt-stabilized MXene composition derived or derivable from a method of any one of Embodiments 1-16.

Embodiment 18. A composition, comprising: a (salt-stabilized) MXene composition having at least one layer having first and second surfaces and an edge, at least one polyanion associated with the edge.

As described elsewhere herein, the salt-stabilized composition can be aqueous; e.g., the MXene composition can be dispersed in water or other aqueous solvent. The salt-stabilized composition can be free-standing. The salt-stabilized composition can be present in platelet form, e.g., as nanosheets.

The salt-stabilized MXene composition can be dispersed in a polymer or other matrix material. In this way, one can form composite materials that include the disclosed salt-stabilized MXene compositions.

It should be understood that the disclosed compositions (and methods) can include one polyanion or multiple polyanions. As an example, a composition can include a polyphosphate polyanion and a polysilicate polyanion. As another example, a composition can include a first polyphosphate polyanion and a second polyphosphate polyanion that differs from the first polyphosphate polyanion.

Embodiment 19. The composition of Embodiment 18, wherein the MXene composition comprises: (a) at least one layer having first and second surfaces and an edge, each layer comprising a substantially two-dimensional array of crystal cells, each crystal cell having an empirical formula of $M_{n+1}X_n$, such that each X is positioned within an octahedral array of M, wherein M is at least one Group IIIB, IVB, VB, or VIB metal, wherein each X is C, N, or a combination thereof; n=1, 2 or 3; and wherein at least one of said surfaces of each layer has surface terminations comprising alkoxide, carboxylate, halide, hydroxide, hydride, oxide, sub-oxide, nitride, sub-nitride, sulfide, thiol, or a combination thereof, or (b) at least one layer having first and second surfaces and an edge, each layer comprising: a substantially two-dimensional array of crystal cells, each crystal cell having an empirical formula of $M'_2M''_nX_{n+1}$, such that each X is positioned within an octahedral array of M' and M'', and where $M''_n$ are present as individual two-dimensional array of atoms intercalated (sandwiched) between a pair of two-dimensional arrays of M' atoms, wherein M' and M'' are different Group IIIB, IVB, VB, or VIB metals, wherein each X is C, N, or a combination thereof, preferably C; and n=1 or 2.

Embodiment 20. The composition of Embodiment 18, wherein the polyanion is a polyborate, a polyphosphate, or a polysilicate.

Embodiment 21. The composition of Embodiment 18, wherein the polyanion is a polyphosphate.

Embodiment 22. An electronic device comprising the composition of any one of Embodiments 18-21.

EXAMPLES

The Examples described herein are provided to illustrate some of the concepts described within this disclosure. While each Example is considered to provide specific individual embodiments of composition, methods of preparation and use, none of the Examples should be considered to limit the more general embodiments described herein. In particular, while the examples provided here focus on specific MXene materials, it is believed that the principles described are relevant to other such MXene materials. Accordingly, the descriptions provided here should not be construed to limit the disclosure, and the reader is advised to look to the nature of the claims as a broader description.

In the following examples, efforts have been made to ensure accuracy with respect to numbers used (e.g. amounts, temperature, etc.) but some experimental error and deviation should be accounted for. Unless indicated otherwise, temperature is in degrees C., pressure is at or near atmospheric.

Experimental Details

Two batches of aqueous $Ti_3C_2T_z$ and $V_2CT_z$ colloidal suspensions were produced according to the details described herein.

The $Ti_3C_2T_z$ colloid batch was divided into 11 batches of 50 ml each. Further, three aliquots of the above salts were made such that the final salt concentration in the 50 ml MXene colloid were 0.1 M, 0.3 M or 0.5 M. The remaining suspensions were used as controls, with no salt added. All the samples were kept open to air for a month before the samples were characterized for oxidation.

In this disclosure, the suffix P is used after the salt molar ratios to indicate the addition of polyphosphate salt, while the suffixes B and Si indicate the addition of polyborate and polysilicate salts, respectively. The Ti and V suffixes, in turn refer to the $Ti_3C_2T_z$ and $V_2CT_z$ MXenes, respectively. For example, the 3 different molar ratios mentioned above for the polyphosphate salts when mixed with $Ti_3C_2T_z$ suspension will be referred to as 0.1PTi, 0.3PTi and 0.5PTi.

Two control samples were also characterized; one in which no salt was added, labelled 0Ti, the other fresh MXene collected right after etching and washing—i.e. not allowed to oxidize—labelled FTi.

For the $V_2CT_z$ composition two controls were used: One in which the $V_2CT_z$ was held in a water open to the atmosphere for 3 weeks labeled as 0V. The other was a MXene film kept under vacuum (≈0.04 atm) also for 3 weeks labeled FV. For $V_2CT_z$ colloidal suspensions, only one sample with 0.1 M polyphosphate salt was made and characterized. This concentration was chosen because, as shown below, it was sufficient to stop oxidation in $Ti_3C_2T_z$.

Example Synthesis

The $Ti_3AlC_2$ MAX powders were made by mixing titanium carbide, TiC, (Alfa Aesar, 99.5% 2 μm), aluminum (Alfa Aesar, 99.5%, −325 mesh), and Ti (Alfa Aesar, 99.5%, −325 mesh), powders in a molar ratio of 2:1.05:1, respectively. The mixed powders were ball milled for 24 h at 70 rpm then heated under flowing argon (Ar) at 1450° C. for 2 h. The heating and cooling rates were set at 5° C./min.

The resulting loosely sintered blocks were ground using a milling bit on a drill press. The milled powders were passed through a 400 mesh (particle size<38 μm) sieve for further experiments.

The sieved powder was etched in a LiF and HCl solution. First, 5 g of LiF (Alfa Aesar, 99.5%, 325 mesh) was dissolved in 50 mL of 12 M HCl (Fisher Scientific), after which 5 g of the $Ti_3AlC_2$ powder was slowly added to the solution. The latter was stirred for 24 h at 35° C. and 500 rpm, and the slurry was later transferred into a 50 mL centrifuge tube and DI water was added to completely fill the remaining volume. It was then centrifuged at 3500 rpm for 120 s and the resulting clear supernatant was discarded and the washing was repeated several times until the pH of the solution was 7, at which point deionized, DI, water was added to the resulting $Ti_3C_2T_x$ "clay" and the mixture sonicated under bubbling Ar flow for 1 h. Ice was added to the sonication bath to avoid oxidation. The solution was then centrifuged for 1 h at 3500 rpm and the supernatant was collected for further use.

The solid content of the supernatant was determined by vacuum filtering a known solution volume and measuring the weight of the resulting free standing MXene film upon drying in a vacuum oven at 100° C. overnight, and found to be roughly 15 mg/ml.

The colloid was separated into 11 parts of 50 ml each. In 3 parts sodium polyphosphate (Sodium polyhposphate, Acros Organics) salt was added to obtain final concentrations of 0.1 M, 0.3 M and 0.5 M. Similarly, sodium polyborate (sodium tertraborate decahydrate, Alfa Aesar) and sodium polysilicate (sodium metasilicate, Alfa Aesar) were added to other 50 ml MXene colloidal suspensions.

After brief stirring, the samples were kept open to air but undisturbed for 1 month. Occasionally DI water added to the containers to compensate for evaporation. In other words, a total volume of 50 ml was always maintained. One part of the sample was filtered using vacuum filtration right after synthesis for characterization of pristine MXene samples. Another part was stored without the polyanionic salts, which acted as a control sample.

After a month all the salt containing samples were centrifuged at 5000 rpm for 120 s and the sediment was collected. After the sediments are collected, they were further washed with DI water 3 more times using similar washing procedure described above. After 3 washes the MXene were easily dispersed back into the DI water, forming a colloid just by shaking. This colloid was in turn vacuum filtered and the free-standing films obtained were later powdered using a mortar and pestle and used for characterization like XRD, XPS and SEM.

To prepare TEM a drop of colloid from the respective sample was cast on a lacy carbon coated copper grid (Cu-400LC, Pacific Grid-Tech) and dried under vacuum.

The $V_2AlC$ MAX powders were made by mixing vanadium carbide, VC, (Alfa Aesar, 99.5% 2 microns), Al (Alfa Aesar, 99.5%, −325 mesh), and V (Alfa Aesar, 99.5%, −325 mesh), powders in a molar ratio of 1:1.13:1, respectively. The mixed powders were ball milled for 24 h at 70 rpm then heated under flowing Ar at 1500° C. for 4 h. The heating and cooling rates were set at 5° C./min.

The resulting loosely sintered blocks were ground using a milling bit on a drill press. The milled powders were passed through a 400 mesh (particle size<38 μm) sieve for further experiments.

Three grams of the sieved powders were etched by adding them to 30 ml of a 50% HF solution (Acros Organics). The solution was held at 55° C. for 3 d and stirred at 500 rpm. Later it was washed until pH 7 using a similar process discussed above.

To delaminate the $V_2CT_z$ multilayer, 3 ml of 1.5 M tertbutyl ammonium hydroxide (TBAOH) was added to added to the ML MXene obtained from above step and mixed using a vortex mixer for 0.5 h, after which the solution was washed with DI water once followed by 3 washes with ethanol. Finally, the ethanol was decanted and 100 ml DI water is added to the TBA intercalated multilayers, and the mixture was further mixed using a vortex shaker for 0.5 h. This disperses the MXene in water and the exfoliated MXene is separated from the colloid by centrifuging it at 3500 rpm for 0.5 h.

After centrifuging the MXene colloid is divided into 2 parts of 50 ml each, to one-part sodium polyphosphate salt is added such that the final concentration if 0.1 M. Nothing is added to the other part. Both the vials are then left open to air for 3 weeks.

Characterization

A SEM (Zeiss Supra 50VP, Germany) was used to examine the morphology and obtain micrographs of the samples.

XRD patterns were recorded using a X-Ray diffractometer (Rigaku Smart Lab, Tokyo, Japan) using Cu $K_\alpha$ radiation (40 kV and 40 mA) with a step size of 0.02° and dwell time of 1 s, in the 2-65° 2θ range.

Monochromatic Al-Kα X-rays with the spot size of 200 μm was used to irradiate the sample surface. Pass energy of 23.5 eV, with a step size of 0.5 eV was used to gather the high-resolution spectra. CasaXPS Version 2.3.19PR1.0 software was used for analysis of spectra. The XPS spectra were calibrated by setting the valance edge to zero, which was calculated by fitting the valence edge with a step down function and setting the intersection to 0 eV.

Results and Discussion:

After storing in water for a month in case of $Ti_3C_2T_z$, and 3 weeks for $V_2CT_z$ in an open container, the various colloid suspensions were washed using DI water several times and filtered through a vacuum filter over a Celgard membrane and dried. The MXene films obtained were then crushed using a mortar and pestle and used for further analysis.

FIG. 6A plots the X-ray diffraction (XRD) patterns of the 0.1PTi (blue, top), 0.1SiTi (green, $2^{nd}$ from top), 0.1BTi (red, $3^{rd}$ from top) and 0Ti (black, bottom) crushed films. The XRD patterns are plotted on a log scale along the y-axis to better visualize the minority phase peaks that may be present.

From these results it is obvious that only 0Ti pattern (bottom pattern in FIG. 6A) showed clear peaks belonging to rutile, $TiO_2$, as indicated by asterisks (JCPDS-#12-1276). More importantly, these peaks are absent from all other samples, even those with the minimum salt concentration of 0.1 M, regardless of their chemistry. The presence of the (002) peak around 6° 2θ and the (110) peak around 61° 2θ in all 4 XRD patterns confirm the presence of MXene and shows that phase degradation does not occur during storage.

Figures 2A, 2B, 2C:
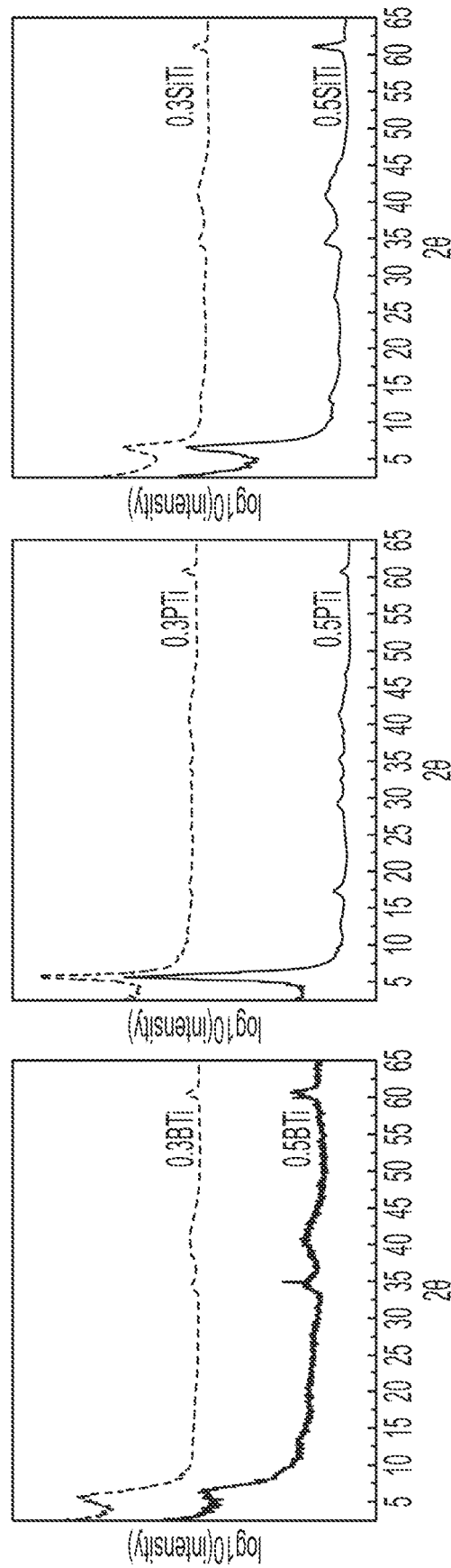
FIGS. 2A-2C provide XRD patterns—log scale—of FIG. 2A) 0.3BTi (red, top), 0.5B Ti (black, bottom) FIG. 2B) 0.3PTi (red, top), 0.5PTi (black, bottom) FIG. 2C) 0.3SiTi (red, top), 0.5SiTi (black, bottom)

The very slight differences in the position of (002) peaks are possibly due to varying levels of hydration in the interlayer space of the $Ti_3C_2T_z$ sheets. The broad peaks near 35° and 40° seen in XRD patterns of 0.1Si and 0.1B (FIG. 6A) are from a convolution of peaks representing the (101) family of crystallographic planes and are typical of $Ti_3C_2T_z$. Not surprisingly, the $TiO_2$ peaks were also absent in samples with higher polyanion salt concentrations (FIGS. 2A-2C).

Furthermore, the absence of peaks associated with the salts in FIG. 6A and FIGS. 2A-2C suggests that these salts can be readily washed away, irrespective of their concentration. This is important in general since such salts, if present, could be detrimental to some properties.

Because the $V_2CT_z$ flakes in the colloidal suspension in which no salt was added completely dissolved (see inset ii in FIG. 6B,) no diffraction patterns could be obtained from this sample. On the other hand, the 0.1PV and the FV (FIG. 6B) samples show the (002) and (110) peaks near 6° and 64° respectively, that are typical of $V_2CT_z$. No other peaks were observed, implying that, at least at the XRD level, the oxidation was undetectable in both cases.

Probably the most dramatic evidence for the potency of the polyphosphate anions in slowing down oxidation are the photographs shown in the inset of FIG. 6B. The picture on the left (FIG. 6B(i)) is of the colloidal suspension of the 0.1PV sample, that on the right (FIG. 6B(ii)) of a suspension with no polyphosphates, both stored in open container in air for 3 weeks.

The $V_2CT_z$ suspension without the salt not only oxidizes but completely dissolves giving the solution an orange tinge characteristic of $V^{+5}$ ions. The 0.1PV sample, on the other hand, did not significantly change color compared to a fresh colloidal suspension (not shown). We note in passing that the water remaining after making the 0.1PV filtered film was colorless, further confirming that the absence of any oxide peaks in the XRD is not because these oxides dissolved in water.

Scanning electron microscope (SEM) micrographs for the 0PTi, 0.1PTi, 0.1BTi, 0.1SiTi films are shown in FIGS. 7A-7D, respectively. Similar to, and consistent with, the XRD results, only in the 0PTi micrograph (FIG. 7A) is there evidence for oxidation in the form of a multitude of nanometer sized particles. These particles appear brighter than the MXene flakes and based on the XRD patterns are most probably $TiO_2$ nanoparticles. These particles are absent in the other samples. It is noteworthy—and again in total accord with the XRD diffraction results, —that no salt crystals are seen in the SEM micrographs, further confirming that the salts were washed off.

Apart from the titania nanoparticles, the planar morphology seen in all 4 micrographs in FIGS. 7A-7D are typical of vacuum filtered MXene films in which the 2D MXene sheets stack densely on top of each other. The micrographs of FV samples also show nanometer sized particles over the surface, which are possibly oxide particles (FIG. 3A). Without being bound to any particular theory, the reason they do not result in XRD peaks is most probably because of their poor crystallinity and/or low concentration. These particles are not seen in SEM micrographs of the 0.1PV sample (FIG. 3B).

Figure 8A:
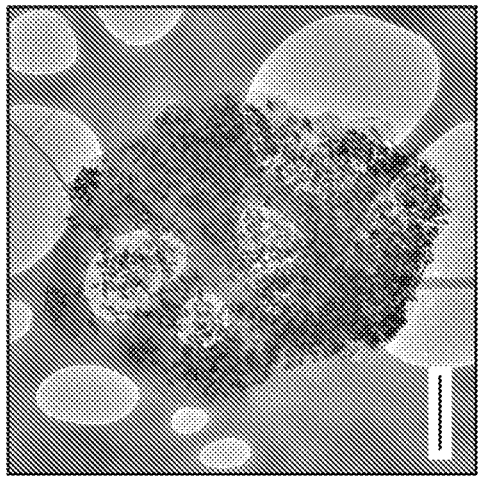
FIGS. 8A-8D provide TEM micrographs of FIG. 8A) 0Ti, FIG. 8B) 0.1PTi, FIG. 8C) 0.1BTi, FIG. 8D) 0.1SiTi samples. Scale bar=0.2 µm.
Figure 8B:
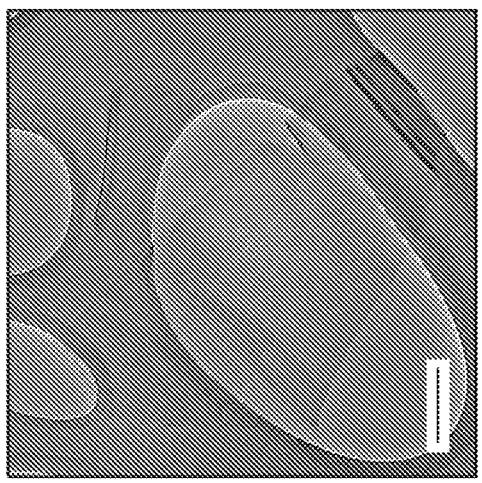
Figure 8C:
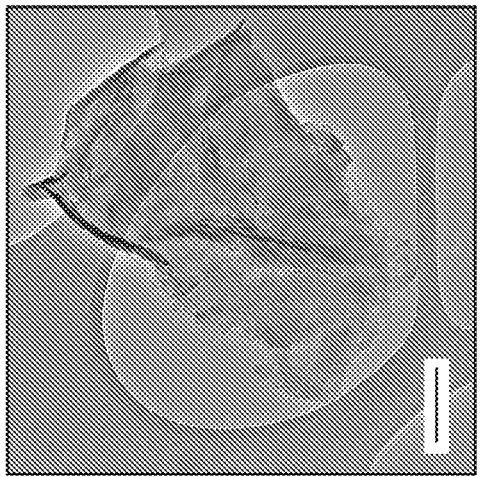
Figure 8D:
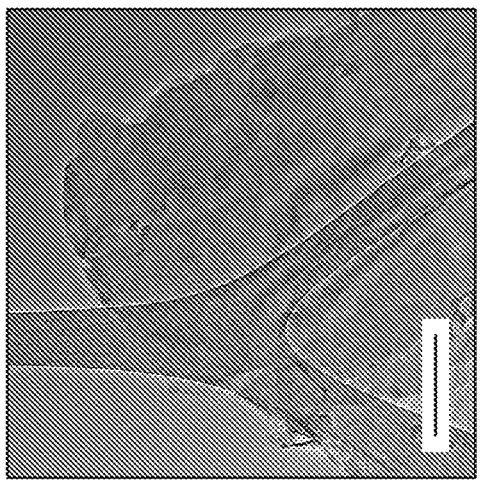

TEM was also used to assess the extent of oxidation on single MXene flakes. The TEM micrographs showed that spindle shaped oxide nanoparticles only grew on $Ti_3C_2T_z$ flakes that we stored without the polyanions (FIG. 8A). In the other 3 samples (FIGS. 8B-8D) these particles were not seen. These results, yet again, directly demonstrate the effectiveness of our polyanion salt treatments in curtailing oxidation. The total lack of any particles in FIGS. 8B and 8C is noteworthy.

To further probe the state of oxidation on the $Ti_3C_2T_z$ flakes, X-ray photoelectron (XPS) spectra were acquired. FIG. 9A plots the XPS spectra of 0.1PTi, 0.1BTi, 0.1SiTi, 0PTi and FTi samples. The two main peaks observed in the Ti photoemission spectra of all 5 samples around 556 eV and 563 eV correspond to Ti $2p_{3/2}$ and Ti $2p_{1/2}$ peaks of $Ti_3C_2T_z$ respectively. These peaks are a convolution of peaks ascribed to various surface terminations like —O, —OH and —F attached to the MXene surfaces.

The gray band, around 459 eV, shown on FIG. 9A, highlights the binding energies associated with Ti in a +4 oxidation state, viz $TiO_2$. The only spectrum for which a signal is obtained in that range is the sample in which no salts were added again confirming the important conclusion that these salts indeed are potent in arresting, or significantly mitigating, oxidation even under the most extreme conditions, viz. water in which O is dissolved. Note that because the $TiO_2$ peaks are clearly visible even without deconvolution of the Ti photoemission spectra, peak fitting was not necessary for this study.

A careful perusal of the spectra shown in FIG. 9A, however, show that for the 0.1PTi and FTi samples the signal is significantly flatter in the gray band that those for the 0.1BTi and 0.1SiTi samples. For the latter, a shoulder appears near the right edge of the gray band suggesting the presence of Ti in a +3 oxidation state. It follows that for reasons that are not entirely clear the phosphate polyanions are the most effective in preventing the oxidation of Ti-based MXenes and are thus recommended.

The XPS spectra of 0.1SiTi sample is unique in that a clear shoulder at lower binding energy (453 eV) is present.

Without being bound to any particular theory, this peak suggests a possible reduction of the $Ti_3C_2T_z$ flakes.

Figure 4A:
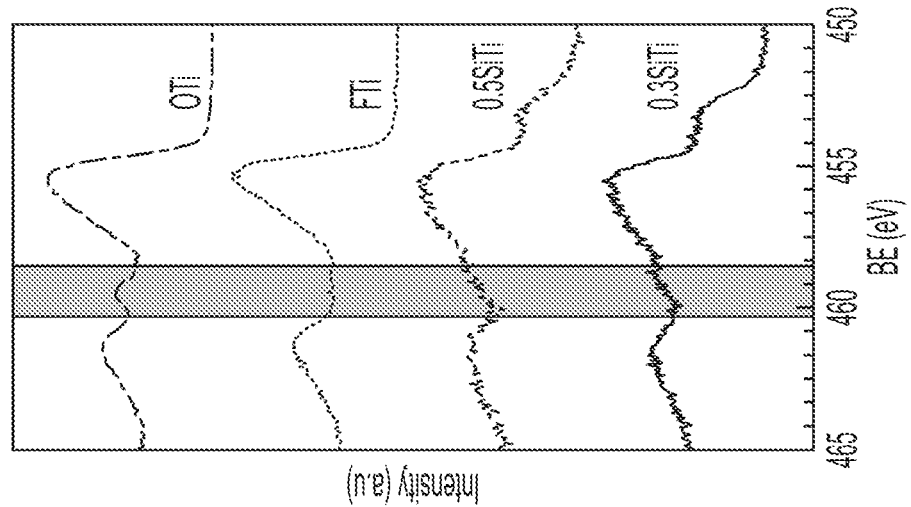
FIGS. 4A-4C provides XPS spectra of FIG. 4A) 0.3BTi (black)), 0.5BTi (red) FIG. 4B) 0.3PTi (black), 0.5PTi (red)
Figure 4B:
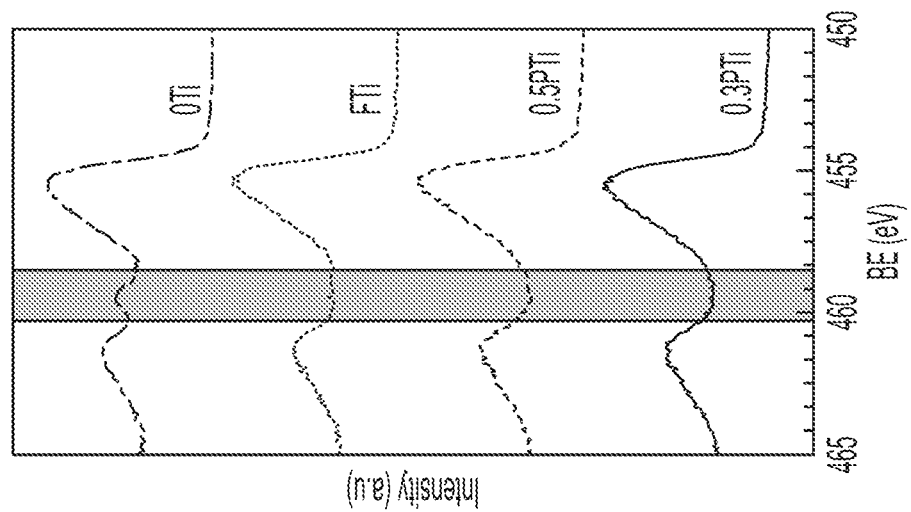
Figure 4C:
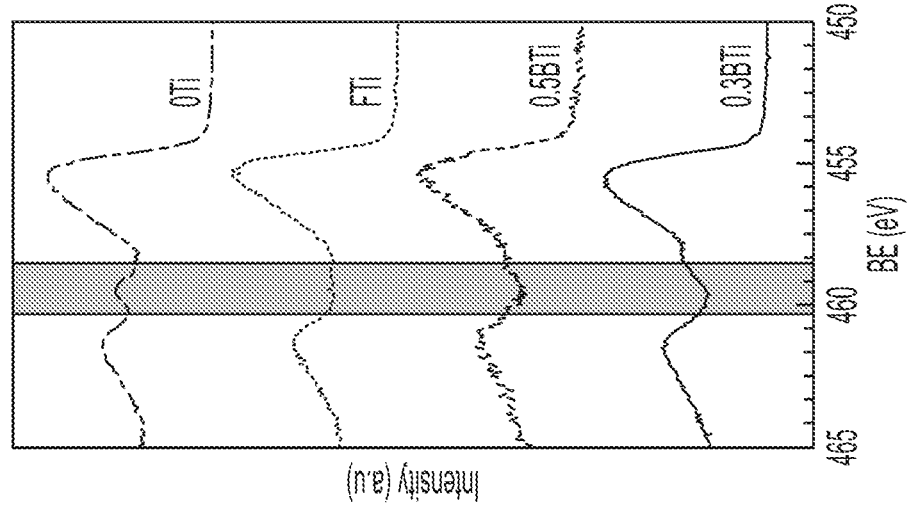

Moreover, analysis of the XPS spectra, showed that the Ti:F ratios for the FTi, 0PTi, 0.1PTi, and 0.1BTi samples were 2.3, 3.0, 3.7, 2.7, respectively. It follows that with time, some of the F-terminations are replaced by —O or —OH terminations. Surprisingly, no F was detected in the 0.1SiTi samples, and more work needs to be done to analyze the MXene surface modification caused by the polysilicate salt. FIGS. 4A-4C show the Ti region photoemission spectra of the higher salt concentration samples all the spectra show no presence of $Ti^{4+}$ and the spectra profiles are similar to those of their 0.1 M counterparts.

FIG. 9B compares the XPS spectra of a FV (black) and 0.1PV (red) samples. The two peaks around 515 eV and 523 eV seen in FIG. 9B are ascribed to $V_2p_{3/2}$ and $V_2p_{1/2}$ respectively. The grey bands around 517 eV and 525 eV represent V in a +5 oxidation state. From these results it is clear that the areas under the peaks in the grey bands is significantly smaller in 0.1PV sample compared to the vacuum stored film. Note here that the comparison was between a colloidal suspension and a $V_2CT_z$ film stored in vacuum.

Figure 10C:
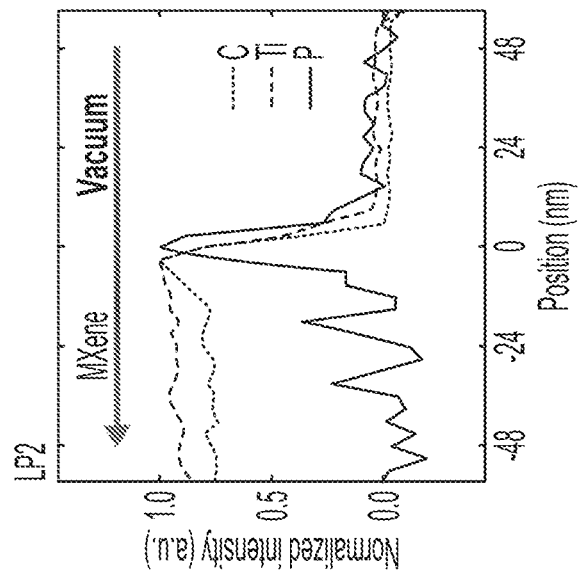
FIGS. 10A-10C provide TEM EELS analysis of $Ti_3C_2T_z$ flake exposed to phosphate polyanions.
Figure 10B:
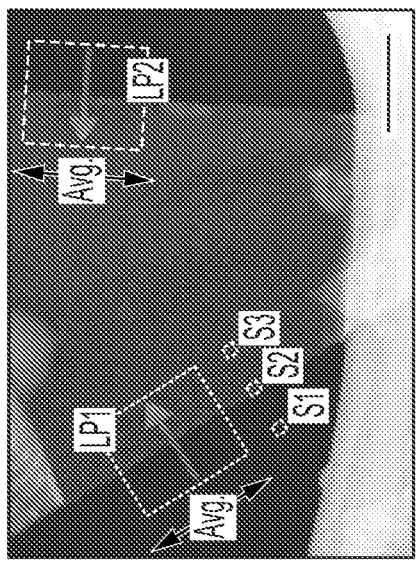
Figure 10A:
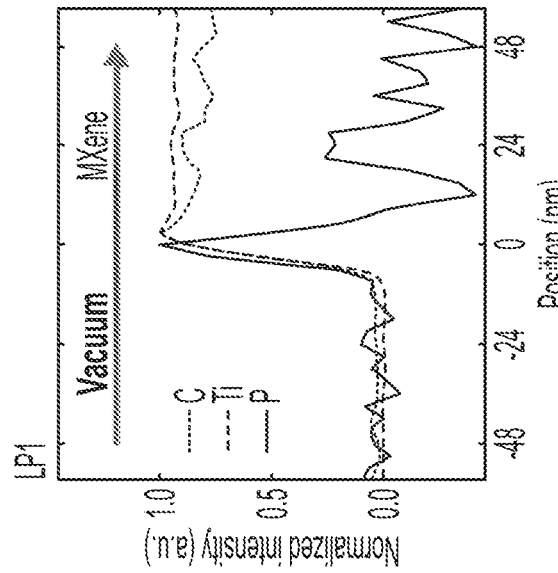

Lastly, to confirm that the phosphate polyanions cap the MXene edges, electron energy loss spectroscopy (EELS) was performed on a single $Ti_3C_2T_z$ flake (FIG. 10B) taken from the 0.1PTi sample. The signals for Ti, C and P were collected moving from vacuum to the MXene flake averaging over a total distance of 150 nm, and the edge position was set at 0 nm. The LP1 and LP2 graphs (FIGS. 10A, 10C) show that the P signal is at a maximum exactly at the edges, thereby confirming our hypothesis. The Ti and C signals are more or less constant from the edges inward, which is to be expected.

Figure 5:
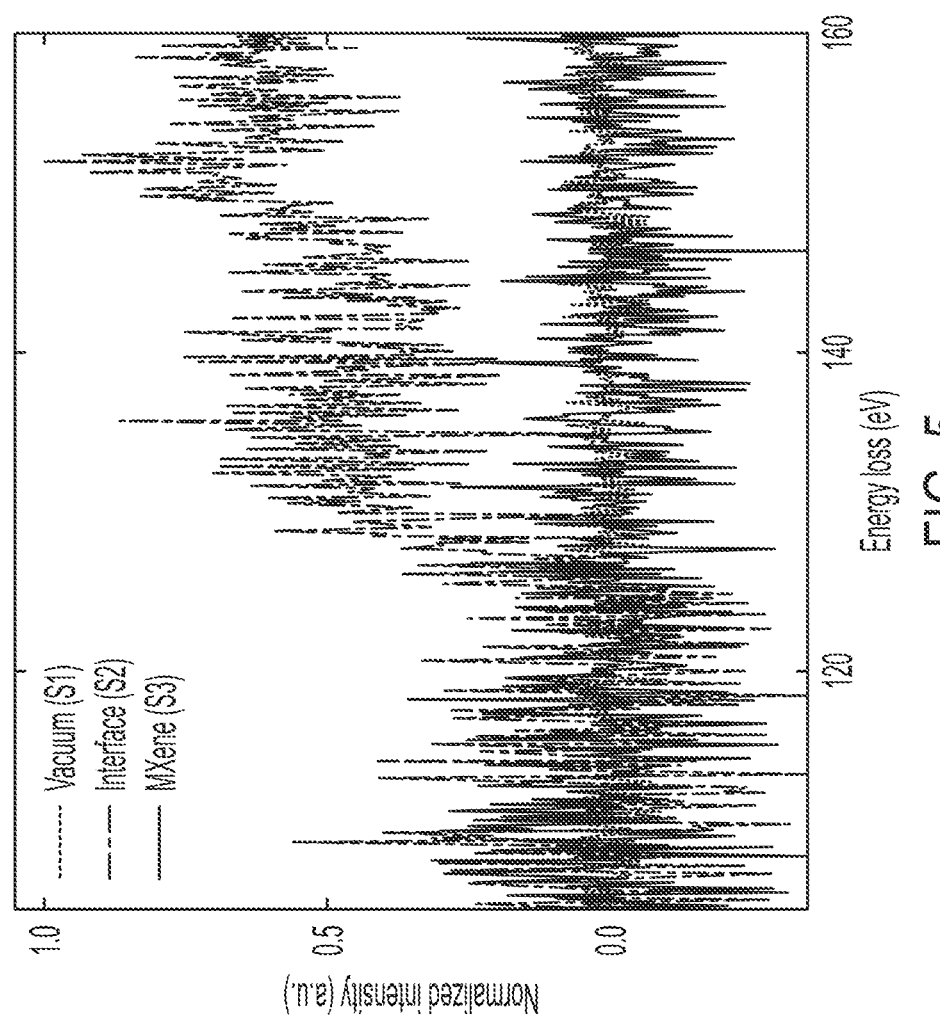
FIG. 5 provides EELS spectra at 3 spots labeled in FIG. 6B: S1 (vacuum), S2 (edge) and S3 (surface).
Figure 7A:
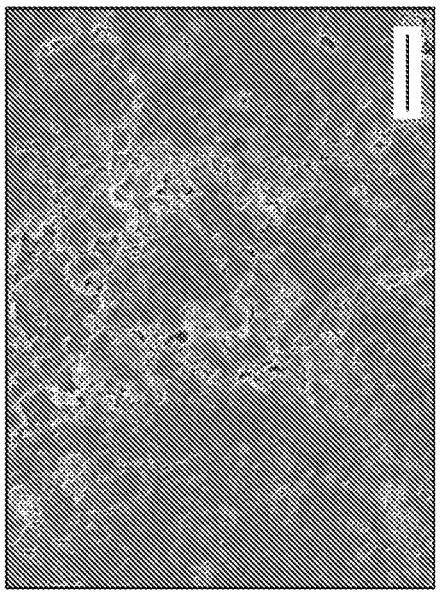
FIGS. 7A-7D provide SEM micrographs of FIG. 7A) 0Ti, FIG. 7B) 0.1PTi,) 0.1SiTi 0.1BTi, FIG. 7D) samples. Scale bar=1 µm.
Figure 7B:
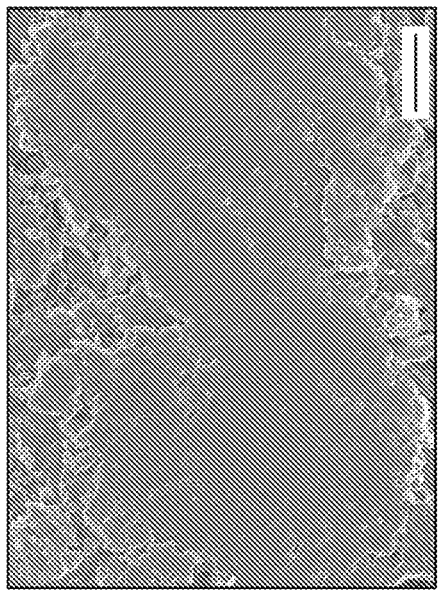
Figure 7C:
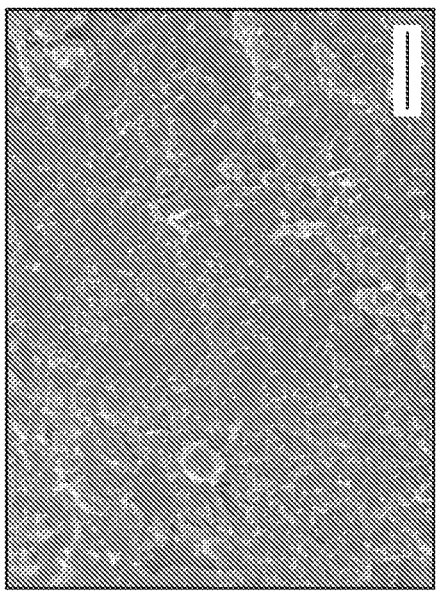
Figure 7D:
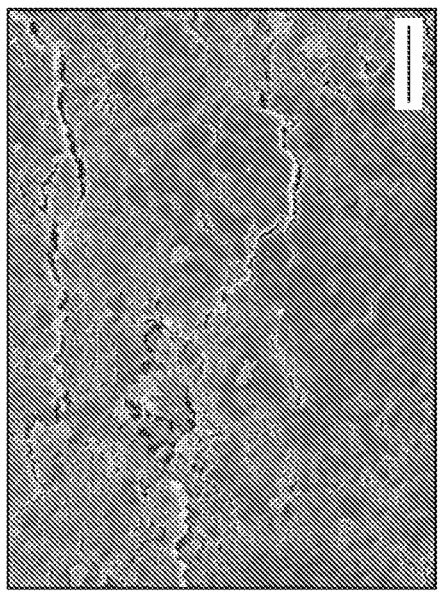

Further, EELS spectra collected at 3 spots—one over vacuum (S1) and one on the MXene surface (S3)—showed no phosphorus signal. A clear phosphorus signal was obtained from the edge (S2) (FIG. 5) further confirming that the polyanions decorate the edges.

Without being bound to any particular theory, one can conclude that this capping passivates the edges and prevents their edge-in oxidation. These results are noteworthy for two reasons: First is their practical importance. Second they provide, for the first time, direct evidence for anion adsorption at the edges of a $Ti_3C_2T_z$ flake.

CONCLUSIONS

In conclusion, the addition of inorganic polyanionic salts to aqueous MXene colloids significantly slows their oxidation. We attribute the reason to capping of the positively charged MXene sheet edges by the polyanions. And while the three salts tested—polyphosphates, polyborates and polysilicates—slowed down oxidation, XPS revealed that the polyphosphate salts are best.

Further it was found that concentrations of only 0.1M were enough to suppress MXene oxidation at least for 3 weeks in aerated water at room temperature. Another advantage of using polyphosphate salts is their non-toxicity, low cost and green credentials rendering them useful for long term storage of MXene colloids, even on an industrial scale.

The following references may be useful in understanding the scope of the present disclosure.

F. Xia, H. Wang, Y. Jia, *Nat. Commun.* 2014, 5, 4458.

K. S. Novoselov, D. Jiang, F. Schedin, T. J. Booth, V. V. Khotkevich, S. V. Morozov, A. K. Geim, *Proc. Natl. Acad. Sci.* 2005, 102, 10451-10453.

M. Naguib, O. Mashtalir, J. Carle, V. Presser, J. Lu, L. Hultman, Y. Gogotsi, M. W. Barsoum, *ACS Nano* 2012, 6, 1322-1331.

L. Verger, C. Xu, V. Natu, H.-M. Cheng, W. Ren, M. W. Barsoum, *Curr. Opin. Solid State Mater. Sci.* 2019, DOI 10.1016/j.cossms.2019.02.001.

Q. Li, Q. Zhou, L. Shi, Q. Chen, J. Wang, *J. Mater. Chem. A* 2019, 7, 4291-4312.

G. Wang, R. Pandey, S. P. Karna, *Wiley Interdiscip. Rev. Comput. Mol. Sci.* 2017, 7, e1280.

M. Sokol, V. Natu, S. Kota, M. W. Barsoum, *Trends Chem.* 2019, DOI 10.1016/j.trechm.2019.02.016.

M. Naguib, M. Kurtoglu, V. Presser, J. Lu, J. Niu, M. Heon, L. Hultman, Y. Gogotsi, M. W. Barsoum, *Adv. Mater.* 2011, 23, 4248-4253.

M. Ghidiu, M. R. Lukatskaya, M.-Q. Zhao, Y. Gogotsi, M. W. Barsoum, *Nature* 2014, DOI 10.1038/nature13970.

M. Han, X. Yin, H. Wu, Z. Hou, C. Song, X. Li, L. Zhang, L. Cheng, *ACS Appl. Mater. Interfaces* 2016, 8, 21011-21019.

V. Natu, M. Clites, E. Pomerantseva, M. W. Barsoum, *Mater. Res. Lett.* 2018, 6, 230-235.

L. Ding, Y. Wei, L. Li, T. Zhang, H. Wang, J. Xue, L.-X. Ding, S. Wang, J. Caro, Y. Gogotsi, *Nat. Commun.* 2018, 9, 155.

C. E. Ren, M. Alhabeb, B. W. Byles, M.-Q. Zhao, B. Anasori, E. Pomerantseva, K. A. Mahmoud, Y. Gogotsi, *ACS Appl. Nano Mater.* 2018, 1, 3644-3652.

S. Intikhab, V. Natu, J. Li, Y. Li, Q. Tao, J. Rosen, M. W. Barsoum, J. Snyder, *J. Catal.* 2019, 371, 325-332.

O. Mashtalir, K. M. Cook, V. N. Mochalin, M. Crowe, M. W. Barsoum, Y. Gogotsi, *J. Mater. Chem. A* 2014, 2, 14334-14338.

C. J. Zhang, S. Pinilla, N. McEvoy, C. P. Cullen, B. Anasori, E. Long, S.-H. Park, A. Seral-Ascaso, A. Shmeliov, D. Krishnan, et al., *Chem. Mater.* 2017, 29, 4848-4856.

S. Huang, V. N. Mochalin, *Inorg. Chem.* 2019, 58, 1958-1966.

K. Maleski, V. N. Mochalin, Y. Gogotsi, *Chem. Mater.* 2017, 29, 1632-1640.

Y. Chae, S. J. Kim, S.-Y. Cho, J. Choi, K. Maleski, B.-J. Lee, H.-T. Jung, Y. Gogotsi, Y. Lee, A. Chi Won, *Nanoscale* 2019, DOI 10.1039/C9NR00084D.

J. A. Evans, A. M. Foster, J.-M. Huet, L. Reinholdt, K. Fikiin, C. Zilio, M. Houska, A. Landfeld, C. Bond, M. Scheurs, et al., *Energy Build.* 2014, 74, 141-151.

J. I. Bidwell, W. B. Jepson, G. L. Toms, *Clay Miner.* 1970, 8, 445-459.

J. K. Edzwald, D. C. Toensing, M. C.-Y. Leung, *Environ. Sci. Technol.* 1976, 10, 485-490.

V. Natu, M. Sokol, L. Verger, M. W. Barsoum, *J. Phys. Chem. C* 2018, 122, 27745-27753.

M. Naguib, R. R. Unocic, B. L. Armstrong, J. Nanda, *Dalt. Trans.* 2015, 44, 9353-9358.

M. Ghidiu, M. W. Barsoum, *J. Am. Ceram. Soc.* 2017, DOI 10.1111/jace.15124.

M. Naguib, M. Kurtoglu, V. Presser, J. Lu, J. Niu, M. Heon, L. Hultman, Y. Gogotsi, M. W. Barsoum, *Adv. Mater.* 2011, 23, 4248-4253.

M. Ghidiu, J. Halim, S. Kota, D. Bish, Y. Gogotsi, M. W. Barsoum, *Chem. Mater.* 2016, 28, 3507-3514.

P. Collini, S. Kota, A. D. Dillon, M. W. Barsoum, A. T. Fafarman, *J. Electrochem. Soc.* 2017, 164, D573-D580.

I. Persson, L.-Å. Naslund, J. Halim, M. W. Barsoum, V. Darakchieva, J. Palisaitis, J. Rosen, P. O. Å. Persson, *2D Mater.* 2017, 5, 015002.

J. Halim, K. M. Cook, M. Naguib, P. Eklund, Y. Gogotsi, J. Rosen, M. W. Barsoum, *Appl. Surf Sci.* 2016, 362, 406-417.

Y. Yoon, T. A. Le, A. P. Tiwari, I. Kim, M. W. Barsoum, H. Lee, *Nanoscale* 2018, 10, 22429-22438.

M. C. Biesinger, B. P. Payne, A. P. Grosvenor, L. W. M. Lau, A. R. Gerson, R. S. C. Smart, *Appl. Surf Sci.* 2011, 257, 2717-2730.

T. V. Kulakovskaya, V. M. Vagabov, I. S. Kulaev, *Process Biochem.* 2012, 47, 1-10.

V. Natu, M. Sokol, L. Verger, M. W. Barsoum, *J. Phys. Chem. C* 2018, 122, 27745-27753.

G. Greczynski, L. Hultman, *ChemPhysChem* 2017, 18, 1507-1512.

As those skilled in the art will appreciate, numerous modifications and variations of the present invention are possible in light of these teachings, and all such are contemplated hereby. All references cited within this specification are incorporated by reference in their entireties for all purposes, or at least for their teachings in the context of their recitation.

What is claimed:

1. A method of stabilizing MXene compositions against oxidation, comprising: contacting a polyanionic salt that comprises at least one of a polyphosphate, a polyborate, and a polysilicate to a MXene composition having at least one layer having first and second surfaces and an edge, the contacting being performed so as to give rise to a corresponding MXene composition having at least one layer having first and second surfaces and an edge having associated therewith the at least one of a polyborate, a polyphosphate, or a polysilicate.

2. The method of claim 1, wherein the MXene composition comprises:

(a) at least one layer having first and second surfaces and an edge, each layer comprising a substantially two-dimensional array of crystal cells, each crystal cell having an empirical formula of $M_{n+1}X_n$, such that each X is positioned within an octahedral array of M, wherein M is at least one Group IIIB, IVB, VB, or VIB metal, wherein each X is C, N, or a combination thereof; n=1, 2 or 3; and wherein at least one of said surfaces of each layer has surface terminations comprising alkoxide, carboxylate, halide, hydroxide, hydride, oxide, sub-oxide, nitride, sub-nitride, sulfide, thiol, or a combination thereof, or (b) at least one layer having first and second surfaces and an edge, each layer comprising:
   a substantially two-dimensional array of crystal cells, each crystal cell having an empirical formula of $M'_2M''_nX_{n+1}$, such that each X is positioned within an octahedral array of M' and M'', and where $M''_n$ are present as individual two-dimensional array of atoms intercalated (sandwiched) between a pair of two-dimensional arrays of M' atoms, wherein M' and M'' are different Group IIIB, IVB, VB, or VIB metals, wherein each X is C, N, or a combination thereof, preferably C; and n=1 or 2.

3. The method of claim 1, wherein $M_{n+1}X_n$ comprises $Sc_2C$, $Sc_2N$, $Ti_2C$, $Ti_2N$, $V_2C$, $V_2N$, $Cr_2C$, $Cr_2N$, $Zr_2C$, $Zr_2N$, $Nb_2C$, $Nb_2N$, $Hf_2C$, $Hf_2N$, $Ti_3C_2$, $Ti_3N_2$, $V_3C_2$, $Ta_3C_2$, $Ta_3N_2$, $Ti_4C_3$, $Ti_4N_3$, $V_4C_3$, $V_4N_3$, $Ta_4C_3$, $Ta_4N_3$, or a combination thereof.

4. The method of claim 1, wherein $M_{n+1}X_n$ comprises $Ti_3C_2$, $Ti_3CN$, $Ti_2C$, $Ta_4C_3$ or $(V_{1/2}Cr_{1/2})_3C_2$.

5. The method of claim 1, wherein M is at least one Group IVB, Group VB, or Group VIB metal.

6. The method of claim 1, wherein M is at least one of Sc, Y, Lu, Ti, Zr, Hf, V, Nb, Ta, Cr, Mo, or W.

7. The method of claim 1, wherein $M'_2M''_nX_{n+1}$ comprises $Mo_2TiC_2$, $Mo_2VC_2$, $Mo_2TaC_2$, $Mo_2NbC_2$, $Mo_2Ti_2C_3$, $Cr_2TiC_2$, $Cr_2VC_2$, $Cr_2TaC_2$, $Cr_2NbC_2$, $Ti_2NbC_2$, $Ti_2TaC_2$, $V_2TaC_2$, or $V_2TiC_2$, preferably $Mo_2TiC_2$, $Mo_2VC_2$, $Mo_2TaC_2$, $Mo_2NbC_2$, $Mo_2Ti_2C_3$, $Mo_2V_2C_3$, $Mo_2Nb_2C_3$, $Mo_2Ta_2C_3$, $Cr_2Ti_2C_3$, $Cr_2V_2C_3$, $Cr_2Nb_2C_3$, $Cr_2Ta_2C_3$, $Nb_2Ta_2C_3$, $Ti_2Nb_2C_3$, $Ti_2Ta_2C_3$, $V_2Ta_2C_3$, $V_2Nb_2C_3$, or $V_2Ti_2C_3$, preferably $Mo_2Ti_2C_3$, $Mo_2V_2C_3$, $Mo_2Nb_2C_3$, $Mo_2Ta_2C_3$, $Ti_2Nb_2C_3$, $Ti_2Ta_2C_3$, or $V_2Ta_2C_3$, or their nitride or carbonitride analogs.

8. The method of claim 1, wherein the polyphosphate comprises diphosphate, triphosphate, tetraphosphate, or any combination thereof.

9. The method of claim 1, wherein the polyborate comprises diborate, triborate, tetraborate, pentaborate, or any combination thereof.

10. The method of claim 1, wherein the polysilicate comprises orthosilicate, disilicate, metasilicate, or pyrosilicate.

11. The method of claim 1, wherein the polysilicate comprises a sorosilicate, a cyclosilicate, a single-chain inosilicate, a double-chain inosilicate, a phyllosilicate, or a tectosilicate.

12. The method of claim 1, wherein the polyanionic salt comprises an alkali metal or an alkaline earth metal.

13. The method of claim 12, wherein the polyanionic salt comprises an alkali metal.

14. The method of claim 1, wherein the MXene composition is in colloid form.

15. A polyanionic salt-stabilized MXene composition derived or derivable from a method of claim 1.

16. A composition, comprising:
   a MXene composition having at least one layer having first and second surfaces and an edge; and
   at least one polyanion associated with the edge, wherein the polyanion is a polyborate, a polyphosphate, or a polysilicate.

17. The composition of claim 16, wherein the MXene composition comprises:

(a) at least one layer having first and second surfaces and an edge, each layer comprising a substantially two-dimensional array of crystal cells, each crystal cell having an empirical formula of $M_{n+1}X_n$, such that each X is positioned within an octahedral array of M, wherein M is at least one Group IIIB, IVB, VB, or VIB metal, wherein each X is C, N, or a combination thereof; n=1, 2 or 3; and wherein at least one of said surfaces of each layer has surface terminations comprising alkoxide, carboxylate, halide, hydroxide, hydride, oxide, sub-oxide, nitride, sub-nitride, sulfide, thiol, or a combination thereof, or (b) at least one layer having first and second surfaces and an edge, each layer comprising:
   a substantially two-dimensional array of crystal cells, each crystal cell having an empirical formula of $M'_2M''_nX_{n+1}$, such that each X is positioned within an octahedral array of M' and M'', and where $M''_n$ are present as individual two-dimensional array of atoms intercalated (sandwiched) between a pair of two-dimensional arrays of M' atoms, wherein M' and M'' are different Group IIIB, IVB, VB, or VIB metals, wherein each X is C, N, or a combination thereof, preferably C; and n=1 or 2.

18. The composition of claim 16, wherein the polyanion is a polyphosphate.

19. An electronic device comprising the composition of claim 16.

* * * * *